(12) United States Patent
Guo et al.

(10) Patent No.: US 11,178,114 B2
(45) Date of Patent: Nov. 16, 2021

(54) DATA PROCESSING METHOD, DEVICE, AND SYSTEM

(71) Applicant: Siemens Aktiengesellschaft, Munich (DE)

(72) Inventors: Dai Fei Guo, Beijing (CN); Xi Feng Liu, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 10 days.

(21) Appl. No.: 16/491,760

(22) PCT Filed: Mar. 9, 2017

(86) PCT No.: PCT/CN2017/076117
§ 371 (c)(1),
(2) Date: Sep. 9, 2019

(87) PCT Pub. No.: WO2018/161302
PCT Pub. Date: Sep. 13, 2018

(65) Prior Publication Data
US 2021/0036995 A1    Feb. 4, 2021

(51) Int. Cl.
*H04L 29/06* (2006.01)
*G06F 21/62* (2013.01)

(52) U.S. Cl.
CPC ...... *H04L 63/0414* (2013.01); *G06F 21/6254* (2013.01); *H04L 63/0421* (2013.01)

(58) Field of Classification Search
CPC ............. H04L 63/0414; H04L 63/0421; H04L 63/0407; G06F 21/6254; G06F 21/60; G06F 21/6245
See application file for complete search history.

(56) References Cited

U.S. PATENT DOCUMENTS

| 9,397,834 | B2 | 7/2016 | Walrath | |
| 2001/0040697 | A1* | 11/2001 | Wu | H04N 1/32416 358/1.15 |
| 2013/0091349 | A1* | 4/2013 | Chopra | H04W 12/088 713/150 |

(Continued)

FOREIGN PATENT DOCUMENTS

| CN | 102752318 A | 10/2012 |
| CN | 103154963 A | 6/2013 |

(Continued)

OTHER PUBLICATIONS

Gedik et al., "Protecting Location Privacy with Personalized k-Anonymity: Architecture and Algorithms", IEEE Transactions on Mobile Computing, vol. 7, Issue: 1, Jan. (Year: 2007).*

(Continued)

*Primary Examiner* — Morshed Mehedi
(74) *Attorney, Agent, or Firm* — Harness, Dickey & Pierce, P.L.C.

(57) ABSTRACT

Provided are a data processing method, device, and system. The data processing method comprises: acquiring a first data packet in a local client network; determining sensitive data in the first data packet; masking the sensitive data in the first data packet, and generating a second data packet from the first data packet; and sending the generated second data packet.

16 Claims, 7 Drawing Sheets

(56) References Cited

U.S. PATENT DOCUMENTS

| | | | | |
|---|---|---|---|---|
| 2013/0205139 A1* | 8/2013 | Walrath | ............... | G06F 21/72 |
| | | | | 713/190 |
| 2014/0101774 A1* | 4/2014 | Armington | ............ | H04L 12/66 |
| | | | | 726/26 |
| 2014/0164405 A1* | 6/2014 | Tsai | ................... | G06F 21/6227 |
| | | | | 707/754 |
| 2015/0009995 A1* | 1/2015 | Gross, IV | .......... | H04L 12/4633 |
| | | | | 370/392 |

FOREIGN PATENT DOCUMENTS

| | | | | |
|---|---|---|---|---|
| CN | 104200177 A | 12/2014 | | |
| CN | 102752318 B | 2/2015 | | |
| CN | 106302328 A | 1/2017 | | |
| DE | 112010005842 T5 | 6/2013 | | |
| GB | 2497464 A | 6/2013 | | |
| WO | WO 2012047200 A1 | 4/2012 | | |
| WO | WO-2015053850 A1 * | 4/2015 | ......... | H04L 61/2521 |
| WO | WO-2017138992 A2 * | 8/2017 | ........... | H04L 49/101 |

OTHER PUBLICATIONS

European Search Report dated Sep. 3, 2020.
International Search Report PCT/ISA/210 for International Application No. PCT/CN2017/076117 dated Mar. 9, 2017.
Written Opinion of the International Searching Authority PCT/ISA/237 for International Application No. PCT/CN2017/076117 dated Mar. 9, 2017.

* cited by examiner

DATA PROCESSING METHOD, DEVICE, AND SYSTEM

PRIORITY STATEMENT

This application is the national phase under 35 U.S.C. § 371 of PCT International Application No. PCT/CN2017/076117, which has an International filing date of Mar. 9, 2017, the entire contents of which are hereby incorporated herein by reference.

FIELD

Embodiments of the present application generally relate to the field of data processing, in particular to a data processing method, device and system, for processing sensitive data in a data packet in a local client network.

BACKGROUND

In a network security monitoring environment, a data acquisition device will often be deployed inside or outside a local client network of an industrial system for example, for the purpose of acquiring data packets in the local client network. For instance, a network security monitor (NSM) may be deployed in a local client network to perform data packet acquisition and preliminary analysis, and the data packets acquired by the NSM are then sent to a control device for performing network security monitoring, e.g. a network security center (Cyber Defense Center); this control device performs processing related to information security.

However, the data packets acquired by the data acquisition device might comprise sensitive data, e.g. personal sensitive information such as usernames and passwords, commercial sensitive information such as quotes and sales, and address information such as internet protocol (IP) addresses. The definition of sensitive data might be different for different local client networks. Sensitive data can be defined according to the characteristics and security requirements etc. of the local client network. Regardless of the nature of the definition of sensitive data, if sensitive data is leaked to third party equipment (e.g. the abovementioned CDC, a performance management center for monitoring network performance, etc.), then this will increase the risk of the local client network or a user within the network being maliciously attacked.

Thus, when data in a local client network is sent to third party equipment, leakage of sensitive data must be avoided.

SUMMARY

The embodiments of the present invention provide a data processing method, for processing a data packet in a local client network, in order to avoid leakage of sensitive data in the data packet.

According to a first aspect, the embodiments of the present invention provide a data processing method, comprising: acquiring a first data packet in a local client network; determining sensitive data in the first data packet; masking the sensitive data in the first data packet, and then generating a second data packet from the first data packet; and sending the generated second data packet.

In a second aspect, the embodiments of the present invention provide a data processing method, comprising: receiving a second data packet from a local client network; acquiring a masking tag, wherein the masking tag is used to identify that the second data packet comprises masked sensitive data; and determining that the second data packet comprises masked sensitive data on the basis of the masking tag.

In a third aspect, the embodiments of the present invention provide data processing method, comprising: receiving a second data packet from a local client network; acquiring a masking tag, wherein the masking tag is used to identify a data type of masked sensitive data in the second data packet; and determining the data type of the masked sensitive data in the second data packet on the basis of the masking tag.

In a fourth aspect, the embodiments of the present invention provide a system for data processing, comprising: a sensitive data processing device, located in the local client network or located outside the local client network, and used for: acquiring a first data packet in the local client network, determining sensitive data in the first data packet, masking the sensitive data in the first data packet, then generating a second data packet from the first data packet, and sending the generated second data packet; a control device, located in the local client network or located outside the local client network, and used for receiving the second data packet.

In a fifth aspect, the embodiments of the present invention provide a sensitive data processing device, characterized by comprising: an acquiring component, configured to acquire a first data packet in a local client network; a determining component, configured to determine sensitive data in the first data packet; a generating component, configured to mask the sensitive data in the first data packet, then generate a second data packet from the first data packet; and a sending component, configured to send the generated second data packet.

In a sixth aspect, the embodiments of the present invention provide a sensitive data processing device, comprising: at least one processor; and at least one memory coupled with the at least one processor, wherein the at least one memory further stores a computer-executable instruction which, when executed by the at least one processor, can perform the data processing method as described in the first aspect or any embodiment of the first aspect.

In a seventh aspect, the embodiments of the present invention provide a computer-readable medium, with a computer instruction being stored on the computer-readable medium; when executed by at least one processor, the computer instruction causes the at least one processor to perform the data processing method as described in the first aspect or any embodiment of the first aspect.

In an eighth aspect, the embodiments of the present invention provide a control device, comprising: a receiving component, configured to receive a second data packet from a local client network; an acquiring component, configured to acquire a masking tag, wherein the masking tag is used to identify that the second data packet comprises masked sensitive data; and a determining component, configured to determine that the second data packet comprises masked sensitive data on the basis of the masking tag.

In a ninth aspect, the embodiments of the present invention provide a control device is provided, comprising: a receiving component, configured to receive a second data packet from a local client network; an acquiring component, configured to acquire a masking tag, wherein the masking tag is used to identify a data type of masked sensitive data in the second data packet; and a determining component, configured to determine the data type of the masked sensitive data in the second data packet on the basis of the masking tag.

In a tenth aspect, the embodiments of the present invention provide a control device, comprising: at least one processor; and at least one memory, coupled with the at least one processor, wherein the at least one memory further stores a computer-executable instruction which, when executed by the at least one processor, can perform the data processing method as described in the second aspect, any embodiment of the second aspect, the third aspect or any embodiment of the third aspect.

In an eleventh aspect, the embodiments of the present invention provide a computer-readable medium, with a computer instruction being stored on the computer-readable medium; when executed by at least one processor, the computer instruction causes the at least one processor to perform the data processing method as described in the second aspect, any embodiment of the second aspect, the third aspect or any embodiment of the third aspect.

Figure 1A:
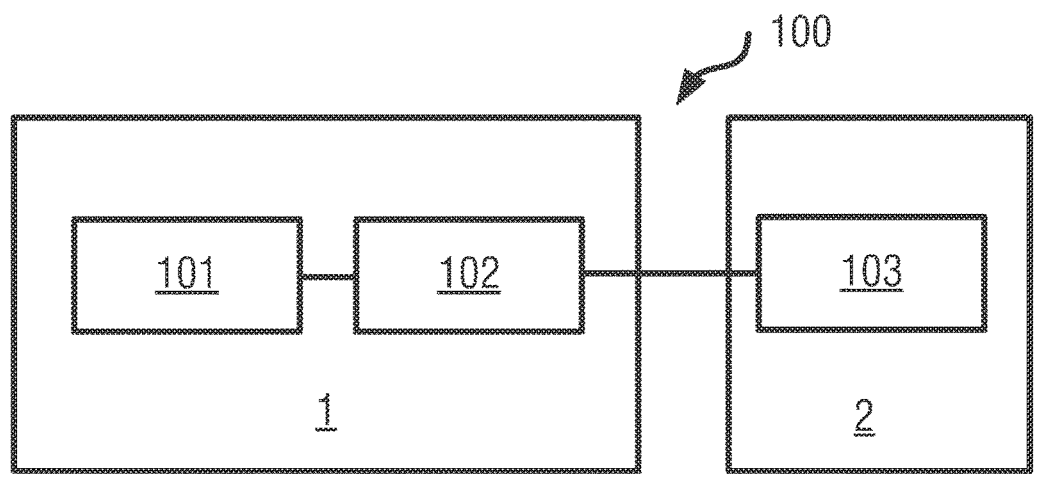
FIGS. 1A to 1D show schematic diagrams for several optional implementation modes of a data processing system, wherein the data processing system may be applied to each embodiment of the present invention.

List of reference numerals in the drawings:

| | | |
|---|---|---|
| 1. Client side | 2. Server side | |
| 100. Data processing system | 101. Local client network | 102. Sensitive data processing device |
| 103. Control device | | |
| 1011. Network data stream | 1012. System log | 1013. System configuration data |
| 1014. Network configuration data | 1015. Safety configuration data | |
| 1021. Sensitive data characteristic extraction unit | 1022. Sensitive data determination unit | 1023. Sensitive data analysis unit |
| 1024. Masking unit | 1025. Event handling unit | 1026. Data receiving unit |
| 1027. First safe communication module | 1028. Sensitive data mapping table | 1029. Sensitive data type table |
| 1031. Network safety monitoring unit | 1032. Sensitive data positioning unit | 1033. Second safe communication module |
| 1034. Safety event sensitive data querying unit | 1035. Network safety event database | 1036. Indication information |

| | | |
|---|---|---|
| 10291. IP address mode | 10292. Username/password mode | 10293. Bank account mode |
| 10294. Phone number mode | 10295. ID card number mode | 10296. Sensitive email mode |
| 10297. Sensitive file mode | 10298. Sensitive configuration information mode | 10299. Sensitive command mode |
| 601. Acquiring component | 602. Determining component | 603. Generating component |
| 604. Sending component | 605. First restoring component | 606. Second restoring component |
| 701. Receiving part | 702. Acquiring component | 703. Determining component |
| 704. Sending component | 801. Processor | 802. Memory |
| 901. Processor | 902. Memory | |

DETAILED DESCRIPTION OF THE EXAMPLE EMBODIMENTS

According to a first aspect, the embodiments of the present invention provide a data processing method, comprising: acquiring a first data packet in a local client network; determining sensitive data in the first data packet; masking the sensitive data in the first data packet, and then generating a second data packet from the first data packet; and sending the generated second data packet.

In this way, sensitive data can be masked; even if the data packet resulting from masking is obtained by third party equipment, the content of the sensitive data therein cannot easily be decoded by the third party equipment due to the fact that the sensitive data has been masked, so that the sensitive data is not leaked.

In one embodiment, the step of determining sensitive data in the first data packet comprises: determining, from a configured sensitive data mapping table, a first mapping table entry matching sensitive data mapping information of the first data packet, and determining sensitive data in the first data packet on the basis of sensitive data positioning information recorded in the first mapping table entry, wherein a mapping table entry in a sensitive data mapping table records an item of sensitive data mapping information, an item of sensitive data positioning information and a correspondence of the two, wherein the sensitive data mapping information comprises keyword information for determining sensitive data; the sensitive data positioning information is used to indicate a position of sensitive data in a data packet comprising the sensitive data mapping information.

In this way, it is possible to determine whether the first data packet comprises sensitive data by way of the sensitive data mapping information in the sensitive data mapping table, and sensitive data can be located quickly in the first data packet on the basis of the sensitive data positioning information recorded in the mapping table entry.

The sensitive data positioning information may comprise information indicating position such as an explicit position, a position characteristic and field identification information.

In one embodiment, the method further comprises receiving an item of sensitive data mapping information and an item of sensitive data positioning information corresponding to the sensitive data mapping information, wherein the sensitive data mapping information received has not been configured; adding a mapping table entry in the sensitive data mapping table, and recording in the added mapping table entry the sensitive data mapping information received, the sensitive data positioning information received and a correspondence of the two.

In this way, it is possible to expand the sensitive data mapping table according to the sensitive data mapping information and sensitive data positioning information received, and then use the expanded sensitive data mapping table to determine and mask sensitive data more broadly and accurately, further ensuring that sensitive data is not leaked.

In one embodiment, the step of masking the sensitive data in the first data packet comprises: replacing the sensitive data in the first data packet, wherein the following is further included after replacing the sensitive data in the first data packet: recording a first replacement data item in the sensitive data mapping table, wherein the first replacement data item comprises: the replaced sensitive data in the first data packet, replacement data used to replace the sensitive data in the first data packet, and a correspondence of the two.

In this manner of replacement, all sensitive data may be replaced with the same replacement data, except that the lengths are different. For instance: all are replaced with a bit stream in a fixed format. Optionally, replacement data that are different from one another may be used for replacement.

This is a first masking solution, i.e. replacing a piece of sensitive data with a piece of replacement data, and recording in the sensitive data mapping table a first replacement data item of the sensitive data, the replacement data and the correspondence between the two, so that the original sensitive data can be subsequently traced according to the replacement data.

In one embodiment, the following is further included after sending the generated second data packet: receiving the returned second data packet; acquiring replacement data in the second data packet, the replacement data being used to replace the sensitive data in the first data packet; determining the first replacement item on the basis of the acquired replacement data; restoring the replaced sensitive data in the first data packet according to the first replacement item.

In this way, when source tracing is performed, the original sensitive data can be traced, according to the first replacement data item recorded in the sensitive data mapping table, on the basis of the replacement data.

In one embodiment, the step of masking the sensitive data in the first data packet comprises: subjecting the sensitive data in the first data packet to a masking operation; the following is further included after subjecting the sensitive data in the first data packet to the masking operation: recording a first masking operation item, wherein the first masking operation item comprises: information of a masking operation method subjecting the sensitive data in the first data packet to the masking operation, sensitive data that has undergone the masking operation in the second data packet, and a correspondence between the two.

This is a second masking solution, i.e. subjecting the sensitive data to a masking operation to generate a piece of sensitive data that has undergone the masking operation, and recording in the sensitive data mapping table the first masking operation item of the sensitive data, the sensitive data that has undergone the masking operation and the correspondence between the two, so that the original sensitive data can be subsequently traced according to the sensitive data that has undergone the masking operation.

In one embodiment, after sending the generated second data packet, the method further comprises: receiving the returned second data packet; acquiring the sensitive data that has undergone the masking operation in the second data packet; determining the first masking operation item on the basis of the acquired sensitive data that has undergone the masking operation; restoring the replaced sensitive data in the first □□□□□□□□□□□□□□□□□□□□□□□□ to the first masking operation item.

In this way, when source tracing is performed, on the basis of the replacement data, a reverse masking operation can be performed according to the first masking operation item recorded in the sensitive data mapping table, in order to trace the original sensitive data.

In one embodiment, the method further comprises: generating a masking tag, wherein the masking tag is used to identify whether the second data packet comprises masked sensitive data, or the masking tag is used to identify a data type of masked sensitive data in the second data packet; and sending the masking tag.

The masking tag is intended to indicate that the second data packet comprises masked sensitive data; equipment or a device that receives the second data packet can determine that the second data packet comprises masked sensitive data on the basis of the masking tag.

By way of example, the masking tag may take two forms:

1. Masking Tag used to identify that the second data packet comprises masked sensitive data (e.g. N bits are reserved at a pre-agreed position in the second data packet, N being a positive integer; one value of the N bits of data indicates that the second data packet comprises masked sensitive data, and another value indicates that the second data packet does not comprise masked sensitive data).

2. Masking Tag used to identify a data type of masked sensitive data in the second data packet (e.g. the data type of the sensitive data is an email address type, username/password type, etc.). By sending the masking tag, the original sensitive data can be subsequently traced.

In one embodiment, the step of sending the masking tag comprises: sending the masking tag, and when sending the masking tag, sending indication information for indicating a correspondence between the masking tag and the second data packet, or placing the masking tag at a first position in the second data packet and then sending same, wherein the first position is a preset position in the masked sensitive data in the second data packet.

In this way, the indication information and the masking tag can be used to learn that the corresponding second data packet comprises masked sensitive data, or the masking tag discovered at the preset position can be used to learn that the second data packet comprises masked sensitive data.

In a second aspect, the embodiments of the present invention provide a data processing method, comprising: receiving a second data packet from a local client network; acquiring a masking tag, wherein the masking tag is used to identify that the second data packet comprises masked sensitive data; and determining that the second data packet comprises masked sensitive data on the basis of the masking tag.

In this way, the masking tag can be used, when the second data packet is received, to learn whether the data packet comprises masked sensitive data, in order to avoid regarding a data packet that has undergone masking as a data packet having no sensitive data, and the sensitive data can be traced.

In a third aspect, the embodiments of the present invention provide a data processing method, comprising: receiving a second data packet from a local client network; acquiring a masking tag, wherein the masking tag is used to identify a data type of masked sensitive data in the second data packet; and determining the data type of the masked sensitive data in the second data packet on the basis of the masking tag.

In this way, the masking tag can be used, when the second data packet is received, to learn a sensitive data type of the masked sensitive data included in the data packet, in order to avoid regarding a data packet that has undergone masking as a data packet having no sensitive data, and the sensitive data can be traced according to the sensitive data type.

In combination with the second aspect or the third aspect, in one embodiment, the step of acquiring a masking tag comprises: receiving the masking tag and a piece of indication information, the indication information being used to indicate a correspondence between the masking tag and the second data packet, and determining that the masking tag corresponds to the second data packet on the basis of the indication information; or acquiring the masking tag from a first position of the second data packet, wherein the first position is a preset position in the masked sensitive data in the second data packet.

By way of the corresponding masking tag and indication information, it is possible to determine the corresponding second data packet, or acquire the masking tag from the preset position, thereby avoiding a one-by-one search of the masking tag and locating of the second data packet. At the same time, sensitive information is acquired on the basis of the indication information and not from the sensitive data mapping table used for managing sensitive data, hence it is possible to avoid learning the original sensitive data directly from the sensitive data mapping table, further ensuring that sensitive data is not leaked.

In combination with the second aspect, any embodiment of the second aspect, the third aspect or any embodiment of the third aspect, in one embodiment, the data processing method further comprises: sending an item of sensitive data mapping information and an item of sensitive data positioning information to a sensitive data processing device, and indicating a correspondence of the two, the sensitive data processing device being used for processing sensitive data in a first data packet in the local client network to generate the second data packet, wherein an item of sensitive data mapping information and sensitive data positioning information corresponding to the sensitive data mapping information are used for the sensitive data processing device determining sensitive data included in a data packet, wherein the sensitive data mapping information comprises keyword information for determining sensitive data; the sensitive data positioning information is used to indicate a position of sensitive data in a data packet comprising the sensitive data mapping information.

In this way, by sending sensitive data mapping information and sensitive data positioning information, the sensitive data mapping table in the sensitive data processing device can be expanded. In this way, the sensitive data processing device can determine and mask sensitive data more broadly and accurately on the basis of the expanded sensitive data mapping table, further ensuring that sensitive data is not leaked.

Before the sensitive data mapping information is sent to the sensitive data processing device, the following is further included: receiving a third data packet from the local client network; determining that the third data packet comprises sensitive data on the basis of a configured item of sensitive data characteristic information; determining that the sensitive data included in the third data packet has not been masked; on the basis of the sensitive data, generating the sensitive data mapping information of the third data packet and sensitive data positioning information corresponding to the sensitive data mapping information; sending the acquired sensitive data mapping information to the sensitive data processing device, and corresponding to the sent sensitive data mapping information, sending the generated sensitive data positioning information to the sensitive data processing device.

In this way, it is possible, on the basis of configured sensitive data characteristic information, to determine sensitive data and generate sensitive data mapping information and sensitive data positioning information. There is no need to perform this processing at the sensitive data processing device, in order to reduce the computing amount of the sensitive data processing device.

In a fourth aspect, the embodiments of the present invention provide a system for data processing, comprising: a sensitive data processing device, located in the local client network or located outside the local client network, and used for: acquiring a first data packet in the local client network, determining sensitive data in the first data packet, masking the sensitive data in the first data packet, then generating a second data packet from the first data packet, and sending the generated second data packet; a control device, located in the local client network or located outside the local client network, and used for receiving the second data packet.

In this way, via the sensitive data processing device, it is possible to mask sensitive data; even if the data packet resulting from masking is obtained by third party equipment, the content of the sensitive data therein cannot easily be decoded by the third party equipment due to the fact that the sensitive data has been masked, so that the sensitive data is not leaked.

In the system, other optional embodiments of the sensitive data processing device may refer to the first aspect or any embodiment of the first aspect; other optional embodiments of the control device may refer to the second aspect/any embodiment of the second aspect or the third aspect/any embodiment of the third aspect.

In a fifth aspect, the embodiments of the present invention provide a sensitive data processing device, characterized by comprising: an acquiring component, configured to acquire a first data packet in a local client network; a determining component, configured to determine sensitive data in the first data packet; a generating component, configured to mask the sensitive data in the first data packet, then generate a second data packet from the first data packet; and a sending component, configured to send the generated second data packet.

In this way, it is possible to mask sensitive data; even if the data packet resulting from masking is obtained by third party equipment, the content of the sensitive data therein cannot easily be decoded by the third party equipment due to the fact that the sensitive data has been masked, so that the sensitive data is not leaked.

In one embodiment, the determining component is specifically configured to: determine, from a configured sensitive data mapping table, a first mapping table entry matching sensitive data mapping information of the first data packet, and determine sensitive data in the first data packet on the basis of sensitive data positioning information recorded in the first mapping table entry, wherein a mapping table entry in a sensitive data mapping table records an item of sensitive data mapping information, an item of sensitive data positioning information and a correspondence of the two, wherein the sensitive data mapping information comprises keyword information for determining sensitive data;

the sensitive data positioning information is used to indicate a position of sensitive data in a data packet comprising the sensitive data mapping information.

In this way, it is possible to determine whether the first data packet comprises sensitive data by way of the sensitive data mapping information in the sensitive data mapping table, and sensitive data can be located quickly in the first data packet on the basis of the sensitive data positioning information recorded in the mapping table entry.

In one embodiment, the acquiring component is further configured to: receive an item of sensitive data mapping information and an item of sensitive data positioning information corresponding to the sensitive data mapping information, wherein the sensitive data mapping information received has not been configured; the determining component is further configured to: add a mapping table entry in the sensitive data mapping table, and record in the added mapping table entry the sensitive data mapping information received by the acquiring component, the sensitive data positioning information received and a correspondence of the two.

In this way, self-learning of sensitive data mapping information and sensitive data positioning information of sensitive data is possible, in order to expand the sensitive data mapping table, and then use the expanded sensitive data mapping table to determine and mask sensitive data more broadly and accurately, further ensuring that sensitive data is not leaked.

In one embodiment, the generating component is specifically configured to: mask the sensitive data in the first data packet by replacing the sensitive data in the first data packet; the generating component is further configured to: record a first replacement data item in the sensitive data mapping table after replacing the sensitive data in the first data packet, wherein the first replacement data item comprises: the replaced sensitive data in the first data packet, replacement data used to replace the sensitive data in the first data packet, and a correspondence between the two.

This is a first masking solution, i.e. replacing a piece of sensitive data with a piece of replacement data, and recording in the sensitive data mapping table a first replacement data item of the sensitive data, the replacement data and the correspondence between the two, so that the original sensitive data can be subsequently traced according to the replacement data.

In one embodiment, the sensitive data processing device further comprises: a first restoring component, configured to: receive the returned second data packet; acquire replacement data in the second data packet, the replacement data being used to replace the sensitive data in the first data packet; determine the first replacement item on the basis of the acquired replacement data; and restore the replaced sensitive data in the first data packet according to the first replacement item.

In this way, when source tracing is performed, the original sensitive data can be traced, according to the first replacement data item recorded in the sensitive data mapping table, on the basis of the replacement data.

In one embodiment, the generating component is specifically configured to mask the sensitive data in the first data packet by subjecting the sensitive data in the first data packet to a masking operation; the generating component is further configured to: record a first masking operation item after subjecting the sensitive data in the first data packet to the masking operation, wherein the first masking operation item comprises: information of a masking operation method subjecting the sensitive data in the first data packet to the masking operation, sensitive data that has undergone the masking operation in the second data packet, and a correspondence between the two.

This is a second masking solution, i.e. subjecting the sensitive data to a masking operation to generate a piece of sensitive data that has undergone the masking operation, and recording in the sensitive data mapping table the first masking operation item of the sensitive data, the sensitive data that has undergone the masking operation and the correspondence between the two, so that the original sensitive data can be subsequently traced according to the sensitive data that has undergone the masking operation.

In one embodiment, the sensitive data processing device further comprises a second restoring component, configured to: receive the returned second data packet; acquire the sensitive data that has undergone the masking operation in the second data packet; determine the first masking operation item on the basis of the acquired sensitive data that has undergone the masking operation; restore the replaced sensitive data in the first data packet according to the first masking operation item.

In this way, when source tracing is performed, on the basis of the replacement data, a reverse masking operation can be performed according to the first masking operation item recorded in the sensitive data mapping table, in order to trace the original sensitive data.

In one embodiment, the generating component is further configured to: generate a masking tag, wherein the masking tag is used to identify whether the second data packet comprises masked sensitive data, or the masking tag is used to identify a data type of masked sensitive data in the second data packet; and the sending component is further configured to: send the masking tag.

By sending the masking tag, the original sensitive data can be subsequently traced.

In one embodiment, the sending component is specifically configured to: send the masking tag, and when sending the masking tag, send indication information for indicating a correspondence between the masking tag and the second data packet, or place the masking tag at a first position in the second data packet and then send same, wherein the first position is a preset position in the masked sensitive data in the second data packet.

In this way, optionally, the indication information and the masking tag can be used to learn that the corresponding second data packet comprises masked sensitive data, or the masking tag discovered at the preset position can be used to learn that the second data packet comprises masked sensitive data.

Other optional embodiments of the sensitive data processing device may refer to the first aspect, or any embodiment of the first aspect.

In a sixth aspect, the embodiments of the present invention provide a sensitive data processing device, comprising: at least one processor; and at least one memory coupled with the at least one processor, wherein the at least one memory further stores a computer-executable instruction which, when executed by the at least one processor, can perform the data processing method as described in the first aspect or any embodiment of the first aspect.

In a seventh aspect, the embodiments of the present invention provide a computer-readable medium, with a computer instruction being stored on the computer-readable medium; when executed by at least one processor, the computer instruction causes the at least one processor to perform the data processing method as described in the first aspect or any embodiment of the first aspect.

In an eighth aspect, the embodiments of the present invention provide a control device, comprising: a receiving component, configured to receive a second data packet from a local client network; an acquiring component, configured to acquire a masking tag, wherein the masking tag is used to identify that the second data packet comprises masked sensitive data; and a determining component, configured to determine that the second data packet comprises masked sensitive data on the basis of the masking tag.

In this way, the masking tag can be used, when the second data packet is received, to learn whether the data packet comprises masked sensitive data, to avoid regarding a data packet that has undergone masking as a data packet having no sensitive data, and the sensitive data can be traced.

In a ninth aspect, the embodiments of the present invention provide a control device is provided, comprising: a receiving component, configured to receive a second data packet from a local client network; an acquiring component, configured to acquire a masking tag, wherein the masking tag is used to identify a data type of masked sensitive data in the second data packet; and a determining component, configured to determine the data type of the masked sensitive data in the second data packet on the basis of the masking tag.

In this way, the masking tag can be used, when the second data packet is received, to learn a sensitive data type of the masked sensitive data included in the data packet, to avoid regarding a data packet that has undergone masking as a data packet having no sensitive data, and the sensitive data can be traced according to the sensitive data type.

In combination with the eighth aspect or the ninth aspect, in one embodiment, the acquiring component is configured to: receive the masking tag and a piece of indication information, the indication information being used to indicate a correspondence between the masking tag and the second data packet, and determine that the masking tag corresponds to the second data packet on the basis of the indication information; or acquire the masking tag from a first position of the second data packet, wherein the first position is a preset position in the masked sensitive data in the second data packet.

By way of the corresponding masking tag and indication information, it is possible to determine the corresponding second data packet, or acquire the masking tag from the preset position, thereby avoiding a one-by-one search of the masking tag and locating of the second data packet. At the same time, sensitive information is acquired on the basis of the indication information and not from the sensitive data mapping table used for managing sensitive data, hence it is possible to avoid learning the original sensitive data directly from the sensitive data mapping table, further ensuring that sensitive data is not leaked.

In combination with the eighth aspect, any embodiment of the eighth aspect, the ninth aspect or any embodiment of the ninth aspect, in one embodiment, the control device further comprises: a sending component, configured to: send an item of sensitive data mapping information and an item of sensitive data positioning information to a sensitive data processing device, and indicate a correspondence of the two, the sensitive data processing device being used for processing sensitive data in a first data packet in the local client network to generate the second data packet, wherein an item of sensitive data mapping information and sensitive data positioning information corresponding to the sensitive data mapping information are used for the sensitive data processing device determining sensitive data included in a data packet, wherein the sensitive data mapping information comprises keyword information for determining sensitive data; the sensitive data positioning information is used to indicate a position of sensitive data in a data packet comprising the sensitive data mapping information.

In this way, by sending sensitive data mapping information and sensitive data positioning information, the sensitive data mapping table in the sensitive data processing device can be expanded. In this way, the sensitive data processing device can determine and mask sensitive data more broadly and accurately on the basis of the expanded sensitive data mapping table, further ensuring that sensitive data is not leaked.

The receiving component is further configured to: receive a third data packet from the local client network before the sending component sends the sensitive data mapping information to the sensitive data processing device; the determining component is further configured to: determine that the third data packet comprises sensitive data on the basis of a configured item of sensitive data characteristic information; determine that the sensitive data included in the third data packet has not been masked; acquire the sensitive data mapping information of the third data packet; and corresponding to the sensitive data mapping information in the third data packet, generate the sensitive data positioning information.

In this way, it is possible, on the basis of configured sensitive data characteristic information, to determine sensitive data and generate sensitive data mapping information and sensitive data positioning information. There is no need to perform this processing at the sensitive data processing device, in order to reduce the computing amount of the sensitive data processing device.

In a tenth aspect, the embodiments of the present invention provide a control device, comprising: at least one processor; and at least one memory, coupled with the at least one processor, wherein the at least one memory further stores a computer-executable instruction which, when executed by the at least one processor, can perform the data processing method as described in the second aspect, any embodiment of the second aspect, the third aspect or any embodiment of the third aspect.

In an eleventh aspect, the embodiments of the present invention provide a computer-readable medium, with a computer instruction being stored on the computer-readable medium; when executed by at least one processor, the computer instruction causes the at least one processor to perform the data processing method as described in the second aspect, any embodiment of the second aspect, the third aspect or any embodiment of the third aspect.

In this way, in summary, sensitive data can be masked; even if the data packet resulting from masking is obtained by third party equipment, the content of the sensitive data therein cannot easily be decoded by the third party equipment due to the fact that the sensitive data has been masked, so that the sensitive data is not leaked.

As described above, if sensitive data in a local client network is leaked to a third-party device, the risk of a malicious attack on the local client network may be increased.

In an embodiment of the present invention, sensitive data in a data packet in a local client network is masked to prevent leakage of the sensitive data; this allows a reduction of the risk of an attack on the local client network, thereby ensuring the network safety of the local client network.

Further, in order to decrease the processing load on a sensitive data processing device that masks sensitive data in an embodiment of the present invention, thereby achieving fast masking, the sensitive data processing device may position the sensitive data in a data packet based on a mapping table entry recorded in a sensitive data mapping table.

Further, the sensitive data processing device may, after completing masking, record the replaced data or masking operation method, so that data tracing can be performed in case of a subsequent network attack, etc.

Further, a mapping table entry in the sensitive data mapping table may be generated by self-learning with the sensitive data processing device, or may be generated by a control device provided by an embodiment of the present invention and sent to a sensitive data processing device, to increase the number of mapping table entries, thereby allowing more accurate subsequent determination of sensitive data and masking.

Further, sensitive data mapping information not only processes sensitive data but also tags a data packet in which sensitive data is masked, so that a recipient, according to the tag, determines that the data packet is masked.

In order to make it easier to understand embodiments of the present invention, certain terms used herein to describe embodiments of the present invention will be explained below. Note that these explanations should not be construed as limiting the protection scope claimed by the present invention.

1. Sensitive Data

Generally, a user of a local client network does not want any sensitive data to be leaked to a third party or a remote control device, for example, a server at a network safety center for monitoring network safety. In addition, the operator of a local client network also may not want leakage of any network information in the local client network, for example, information in a network log or configuration information in a network configuration file, to a third party or a remote control device. Data like that described above, of which leakage to a third-party control device is not wanted, is referred to as "sensitive data" in an embodiment of the present invention. Sensitive data specifically comprises which content can be predefined; for example, the operator of a local client network predefines which data is sensitive data. The above-described sensitive data is generally contained in data packets for transmission. If sensitive data is not preprocessed, after a data packet containing such sensitive data is received by a third party, the third party may obtain the content of the sensitive data, threatening network safety of the local client network and safety of users' personal data.

In an embodiment of the present invention, sensitive data is generated by a local client network and contained in data packets for transmission on the local client network. Optionally, sensitive data may be contained in service data, and may be contained in one or more fields, such as username, password, and IP address, in service data. Optionally, sensitive data may be contained in a network log. Optionally, sensitive data may be contained in a configuration file. Any data from a local client network that involves user privacy or network safety of the local client network may be considered sensitive data. Sensitive data may be defined by the operator of a local client network based on its safety level. Sensitive data may be from a control device, a router, a switch, etc. in a local client network. Note that a data packet may comprise a plurality of pieces of sensitive data, for example, concurrently comprising a username/password and an email address.

2. Sensitive Data Mapping Table

In certain embodiments of the present invention, a sensitive data processing device may, by a sensitive data mapping table, determine sensitive data in a data packet, quickly determine, by querying the table, whether a data packet contains sensitive data, and, if the data packet contains sensitive data, quickly obtain the sensitive data in the data packet.

The sensitive data mapping table may be located in a sensitive data processing device. Alternatively, the sensitive data mapping table may be located outside a sensitive data processing device but may be obtained by a sensitive data processing device.

A sensitive data mapping table contains at least one mapping table entry.

A mapping table entry records the following information:
1) an item of sensitive data mapping information, and
2) an item of sensitive data positioning information, these two items of information corresponding to each other, wherein sensitive data mapping information comprises at least one type of the following information:
protocol type of a data packet, protocol version number of a data packet, message type of a message contained in a data packet, field tag of a field contained in a data packet, keyword information for determining sensitive data, etc.

Sensitive data positioning information indicates a position of sensitive data in a data packet containing the sensitive data mapping information.

A sensitive data processing device provided by an embodiment of the present invention, after receiving a data packet, first obtains sensitive data mapping information in the data packet, then queries the sensitive data mapping table based on the obtained sensitive data mapping information to find the mapping table entry matching the sensitive data mapping information in the data packet; for example, sensitive data mapping information in the data packet is included in sensitive data mapping information recorded in the mapping table entry, and then, based on the sensitive data positioning information in the matched mapping table entry, determines the received sensitive data in the data packet, wherein sensitive data positioning information may comprise, but is not limited to, at least one type of the following information:
1) position information about a specific position in which sensitive data is located, for example, the start byte or start bit, length, etc.; and
2) if sensitive data exists in a field in a data packet, then sensitive data positioning information may be a field tag of the field.

3. Replacement Data Item

In certain embodiments of the present invention, a sensitive data processing device, after replacing sensitive data in a data packet, generates a replacement data item recording the replaced sensitive data and the replacement data used to replace the sensitive data, the two recorded data items corresponding to each other.

This allows the original data to be traced conveniently.

For example, in an embodiment of the present invention, a data packet in a local client network, after being processed by a sensitive data processing device, is sent to a third-party network safety center. The network safety center, based on the received data packet, detects a safety abnormality; for example, after receiving, within a short time, a large number of data packets that have the same source IP address, the network safety center infers that a network attack event may have occurred; however, this source IP address is masked, and the network safety center does not know what the actual IP address is. The network safety center returns the replaced IP address to the sensitive data processing device, and the sensitive data processing device, based on a previously recorded replacement data item, finds the IP address used before the replacement, thereby locating the source of the network attack.

Optionally, when the replacement data item is generated, a timer may be generated accordingly; the length of the timer may be determined on the basis of the actual condition of the network, for example, 20 seconds; when the timer times out, the replacement data item is deleted. Thus, maintenance of an excessive number of replacement data items is avoided.

A length of the timer may be determined on the basis of the transmission delay of a data packet, processing delay of the network safety center, etc. A length should be sufficient for the network safety center to judge a safety event and return replaced data.

A replacement data item is maintained by a sensitive data processing device in an embodiment of the present invention, may be stored in the sensitive data processing device, or may be stored in a separate storage device, or may be stored in another control device.

4. Masking Operation Item

In certain embodiments of the present invention, masking operation may be performed on the sensitive data in a data packet, and one masking operation item may be recorded, wherein the masking operation item may comprise:
information about a masking operation method for performing masking operation on the above-mentioned sensitive data in a data packet that is subject to masking operation;
sensitive data that has undergone masking operation in the above-mentioned data packet that has undergone masking operation; and
correspondence between information about the masking operation method and sensitive data that has undergone masking operation.

Such masking operation also provides traceability. In other words, from sensitive data that has undergone masking operation and known information about the masking operation method, the original sensitive data that has not undergone masking operation may be traced, thus achieving the purpose of locating the source of the original data.

The specific source tracing process may, after sending a data packet that has undergone masking operation, further comprise: receiving the data packet returned; obtaining sensitive data in the data packet that has undergone masking operation; determining, on the basis of the obtained sensitive data that has undergone masking operation, the corresponding masking operation item; and restoring, on the basis of the determined masking operation item, the replaced sensitive data in the data packet.

5. Sensitive Data Characteristic Information

Whether original data contains any sensitive data may be determined by determining whether the original data contains matching sensitive data characteristic information.

Figure 4:
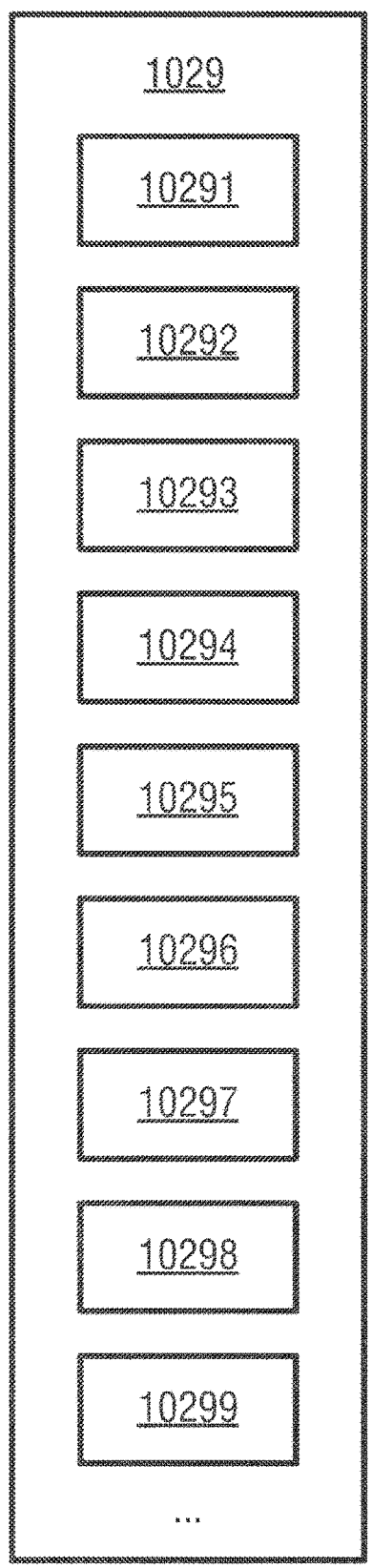
FIG. 4 shows a schematic diagram for data types stored in a sensitive data type table according to an embodiment of the present invention.

The sensitive data characteristic information may be stored in a sensitive data type table 1029, or the sensitive data characteristic information may be organized in the form of a database. The sensitive data type table 1029 or database may include, but is not limited to, the following modes shown in FIG. 4: IP address mode 10291, username/password mode 10292, bank account mode 10293, phone number mode 10294, ID card number mode 10295, sensitive email mode 10296, sensitive file mode 10297, sensitive configuration information mode 10298, sensitive command mode 10299, etc., and examples will not be fully enumerated herein. These modes may define characteristics possessed by sensitive data. For example, in the IP address mode, a data packet may be defined as containing sensitive data if the source address or destination address of the data packet meets a certain condition. Alternatively, data describing a username/password in a data packet may be defined as sensitive data, etc. Such sensitive data characteristic information may also be updated and configured continuously for improvement.

6. Masking Tag

A sensitive data processing device may, after performing masking operation on sensitive data, indicate, with a masking tag, that the sensitive data in a data packet has undergone masking operation but is not the original sensitive data, and also indicate that the data having undergone masking operation is sensitive data, because no masking operation is needed for non-sensitive data.

The masking tag may be used to indicate that a data packet contains sensitive data that has undergone masking. Alternatively, the masking tag may be used to indicate the data type of sensitive data contained in a data packet that has undergone masking. Specifically, a masking tag, for example, takes one of two forms:

1) Masking Tag

It is used to indicate that the second data packet contains sensitive data that has undergone masking (for example, N bits are reserved in a preset position of the second data packet, N being a positive integer; a value of the N-bit data indicates that the second data packet contains sensitive data that has undergone masking, and another value indicates that the second data packet does not contain sensitive data that has undergone masking).

2) Masking Tag

It indicates the data type of sensitive data that has undergone masking in the second data packet (for example, the data type of sensitive data is email address type, username/password type, etc.). By sending the masking tag, the original sensitive data may be traced subsequently.

A sensitive data processing device, after generating a masking tag, may send the masking tag and, when sending the masking tag, send indication information for indicating the correspondence between the masking tag and a data packet, or place the masking tag in a preset position in the data packet for sending, the preset position being in sensitive data that has undergone masking.

7. First Data Packet, Second Data Packet, and Third Data Packet

Based on whether sensitive data has undergone masking, data packets involved in an embodiment of the present invention are differentiated as follows:

1) First Data Packet

A first data packet is sourced from a local client network and sent to a sensitive data processing device. The first data packet may contain sensitive data, and if it contains sensitive data, then the sensitive data has not undergone masking.

2) Second Data Packet

A second data packet is a data packet generated after a sensitive data processing device performs masking on the sensitive data in a first data packet.

3) Third Data Packet

A third data packet is also sourced from a local client network, comprising sensitive data that has not undergone masking, and obtained by a control device or a sensitive data processing device provided by an embodiment of the present invention; in addition, based on sensitive data characteristic information, it can be determined that the third data packet contains sensitive data, and the sensitive data mapping information and sensitive data positioning information of the third data packet are further determined.

The present invention will be described in detail below with reference to specific embodiments and the drawings. Although the present invention will be described with reference to specific embodiments, it should be understood that the present invention is not limited to the described embodiments; instead, the present invention is intended to cover any modifications, alterations, and equivalents made without departing from the spirit or scope of the present invention defined by the attached claims. It should be noted that a method step described herein may be implemented by any functional block or functional arrangement, and that any functional block or functional arrangement may be implemented as a physical entity or logical entity, or a combination thereof.

System Embodiment

FIGS. 1A to 1D show block diagrams for several optional implementation modes of a data processing system 100 in which each embodiment of the present invention is applied.

First, FIG. 1A shows a schematic block diagram for a data processing system 100 in which an embodiment of the present invention is applied.

The data processing system 100 as shown in FIG. 1A comprises:

a sensitive data processing device 102 coupled to a local client network 101, and a control device 103, wherein the control device 103 may be a server. Alternatively, the control device may be located in a server, being a constituent element of the server. The sever may be the above-mentioned CDC, performance management center, etc., or may be a remote server.

Figure 1B:
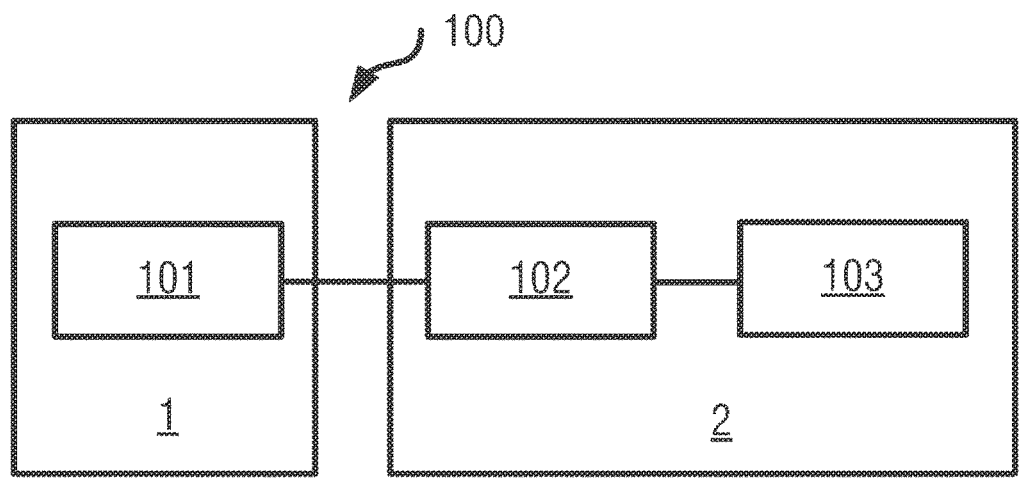
Figure 1C:
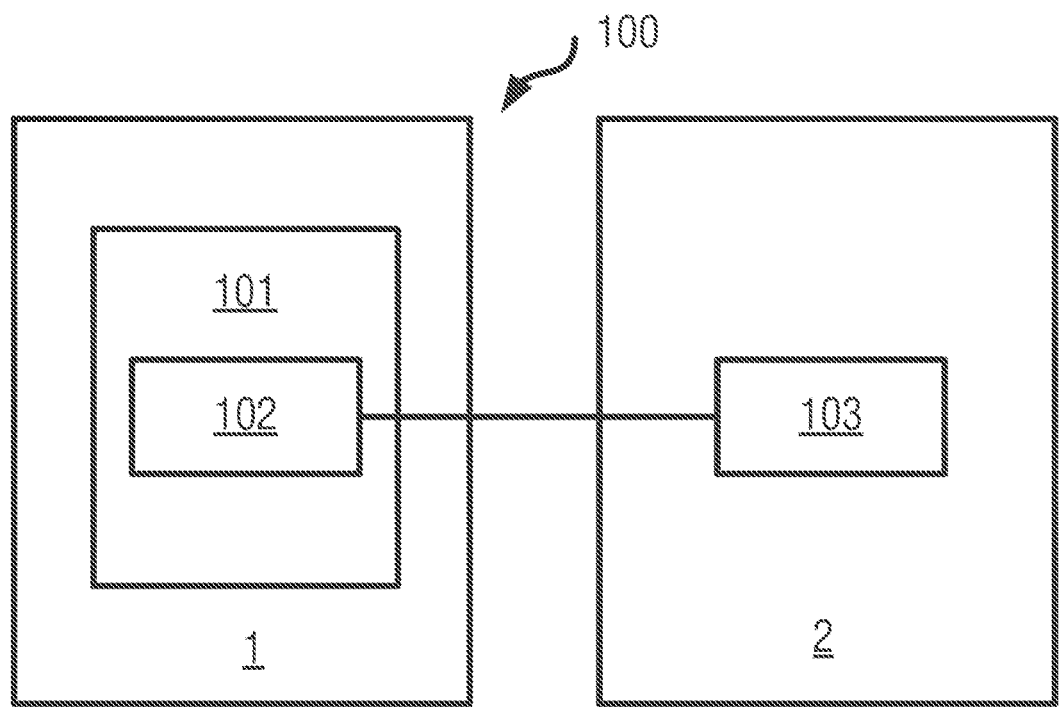

As shown in FIG. 1A, the sensitive data processing device 102 and the control device 103 are located outside the local client network 101. Optionally, the local client network 101 and the sensitive data processing device 102 are located on a client side 1, while the control device 103 is located on a server side 2, wherein under a client/server network architecture, a client sends a server a service request to request a service on the server, and the server, upon receiving the service request, provides the service to the client. As shown in FIGS. 1A to 1C, the control device 103 functions as a server, or the server on which the control device 103 is located may provide a service and is on the server side 2; a device in the local client network 101 may, as a client, request a service, and so the local client network 101 is on the client side 1. The sensitive data processing device 102 may be on the client side 1 as shown in FIGS. 1A and 1B, or may be on the server side 2 as shown in FIG. 1B.

In the data processing system 100, the sensitive data processing device 102 receives data and information from a local client network 101 and obtains a first data packet from the local client network 101, determines sensitive data in the first data packet, performs masking on the sensitive data in the first data packet so that the first data packet generates a second data packet, and sends the generated second data packet to the control device 103 on the server side 2. Thus, masking may be performed on sensitive data; even if a data packet that has undergone masking is obtained by a third-party device, the sensitive data in the packet, which has undergone masking, is not easily decrypted by the third-party device, and so leakage of sensitive data is avoided.

The method of determining sensitive data, the method of generating a sensitive data mapping table, the method of masking, and the method of indicating that a first data packet contains a masking tag in an embodiment of the present invention will be described below.

[Determination of Sensitive Data]

Figure 2:
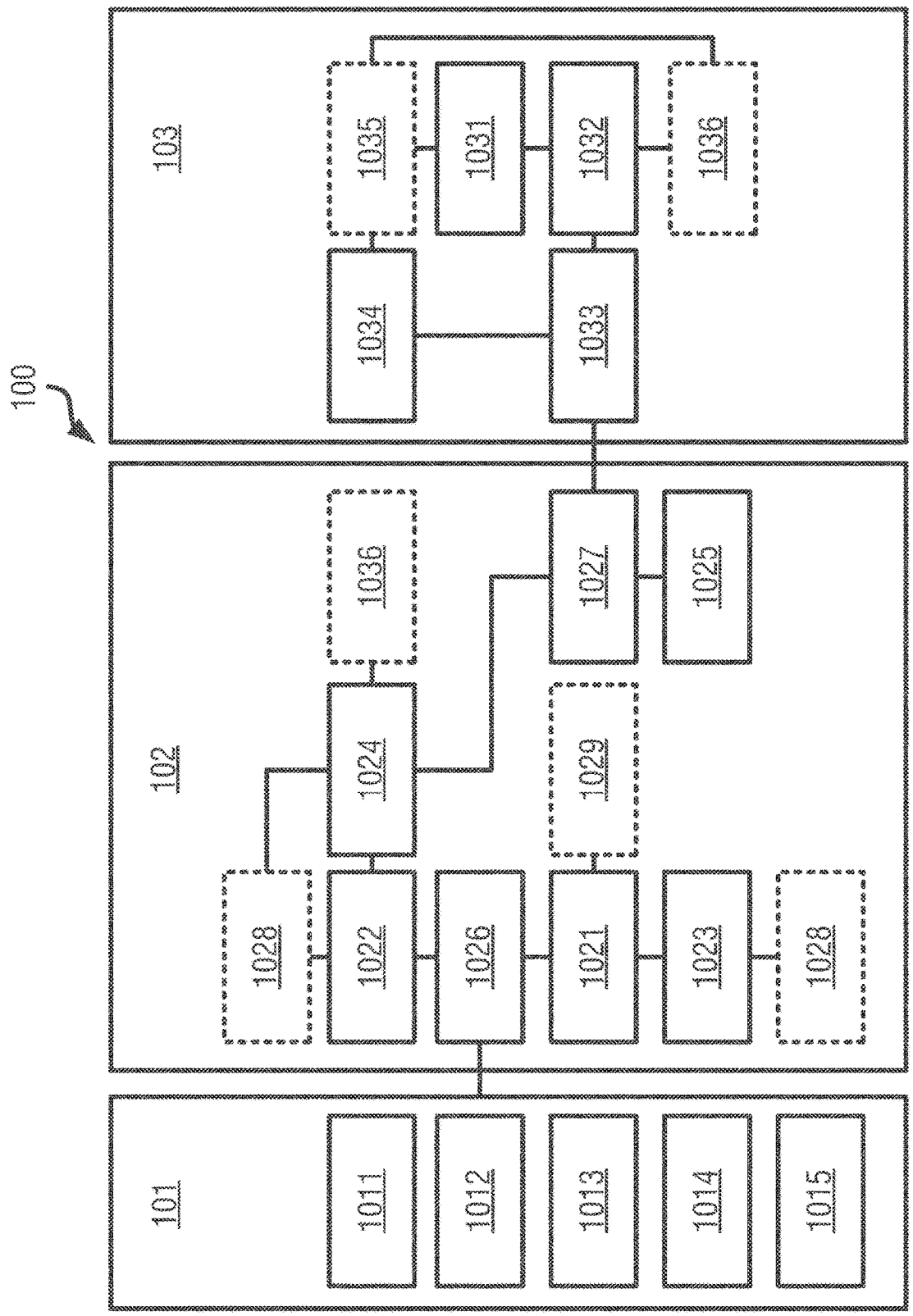
FIG. 2 shows a block diagram for the internal units and modules of a data processing system in which each embodiment of the present invention is applied.

In an embodiment, the sensitive data processing device 102 may further, from a configured sensitive data mapping table 1028, determine a first mapping table entry that matches the sensitive data mapping information of the first data packet, and, based on the sensitive data positioning information recorded in the first mapping table entry, determine sensitive data in the first data packet. In an embodiment, the sensitive data mapping table 1028 may be stored in a database; in other words, data in the sensitive data mapping table 1028 may be organized in the form of a database. A mapping table entry in a sensitive data mapping table 1028 (as shown in FIG. 2) records an item of sensitive data mapping information, an item of sensitive data positioning information, and correspondence between the two, wherein the sensitive data mapping information comprises at least one type of the following information: protocol type of a data packet, protocol version number of a data packet, message type of a message contained in a data packet, field tag of a field contained in a data packet, and keyword information for determining sensitive data; the sensitive data positioning information indicates a position of sensitive data in a data packet containing the sensitive data mapping information.

The sensitive data processing device 102 may, based on the sensitive data mapping information in the sensitive data mapping table 1028, determine whether the first data packet contains sensitive data and may, based on the sensitive data positioning information recorded in the mapping table entry, quickly locate sensitive data in the first data packet.

The sensitive data positioning information may comprise a definite position, a position characteristic, field tag information, and other position-indicating information.

Note that the sensitive data mapping table 1028 may be stored in the sensitive data processing device 102, or may be stored outside each data processing device or even on the remotely connected server side 2, which is not limited herein.

[Generation of a Sensitive Data Mapping Table]

The sensitive data processing device 102 may obtain sensitive data mapping information and sensitive data positioning information by methods including the following two methods:

Method 1

The sensitive data processing device 102 may, from a control device 103 or another device, receive an item of sensitive data mapping information and an item of sensitive data positioning information that corresponds to the sensitive data mapping information, the sensitive data mapping information received not having been configured.

The sensitive data processing device 102 adds a mapping table entry to the sensitive data mapping table 1028, the added mapping table entry recording the sensitive data mapping information received, the sensitive data positioning information received, and correspondence between the two.

With method 1, the sensitive data processing device 102 does not need to generate sensitive data positioning information or sensitive data mapping information, and thus the processing load on the sensitive data processing device 102 is reduced.

If the control device 103 generates sensitive data mapping information and sensitive data positioning information and sends it to the sensitive data processing device 102, then the control device 103 may, before sending such information, receive a third data packet from the local client network 101, determine, based on the above-described sensitive data characteristic information, that the third data packet contains sensitive data, and determine that the sensitive data contained in the third data packet has not undergone masking (for example, no masking tag that corresponds to the third data packet has been received). Thus, the control device 103 may, based on the third data packet, generate sensitive data mapping information and sensitive data positioning information that corresponds to the sensitive data mapping information. The control device 103 sends to the sensitive data processing device 102 the generated sensitive data mapping information and the corresponding sensitive data positioning information.

The control device 103 (instead of the sensitive data processing device 102), based on sensitive data characteristic information, judges whether the third data packet contains sensitive data and determines the position of sensitive data in the third data packet, thereby generating sensitive data mapping information and sensitive data positioning information. Thus, the calculation load on the sensitive data processing device 102 may be reduced, and concurrent processing with the sensitive data processing device 102 is allowed, thus improving processing efficiency.

Method 2

The sensitive data processing device 102, by self learning, determines sensitive data mapping information and sensitive data positioning information.

For example, the sensitive data processing device 102, after receiving a data packet from a local client network 101, queries a sensitive data mapping table 1028 and does not find a corresponding mapping table entry. The sensitive data processing device 102 may, based on the sensitive data characteristic information shown in FIG. 4, determine whether a received data packet contains sensitive data, generate sensitive data mapping information and sensitive data positioning information, add a mapping table entry to the sensitive data mapping table 1028, and record, in the added mapping table entry, the generated sensitive data mapping information, sensitive data positioning information, and correspondence between the two.

Thus, sensitive data mapping information and sensitive data positioning information of sensitive data may be self-learned to expand the sensitive data mapping table 1028, and the expanded sensitive data mapping table 1028 may then be used to determine sensitive data and perform masking more extensively and accurately, thereby further ensuring that no leakage of sensitive data occurs.

[Masking]

The sensitive data processing device 102 may perform masking on the sensitive data in a first data packet by methods including the following two methods:

Method 1

The sensitive data processing device 102 may perform masking on the sensitive data in the first data packet by replacing the sensitive data in the first data packet. After replacing the sensitive data in the first data packet, the sensitive data processing device 102 may record a first replacement data item (for example, recording the first replacement data item in a table), wherein the first replacement data item comprises: replaced sensitive data in the first data packet, replacement data used to replace sensitive data in the first data packet, and correspondence between the two.

Such replacement may be replacement of all sensitive data with the same replacement data, differing only in length. For example, all sensitive data is replaced by bit streams in a fixed format. Optionally, replacement may also be done with differing replacement data. Optionally, replacement may also be done with differing replacement data. Further, replacement data may be general information or interleaved information.

With method 1, an item of sensitive data is replaced with an item of replacement data, and a first replacement data item of the sensitive data, the replacement data, and correspondence between the two is recorded in the sensitive data mapping table 1028, so that the original sensitive data can be subsequently traced on the basis of the replacement data.

With method 1 for masking, the sensitive data processing device 102 may, after sending the generated second data packet, further receive the second data packet returned by the control device 103, obtain replacement data in the second data packet that is used to replace sensitive data in the first data packet; determine the first replacement data item based on the obtained replacement data; and, according to the first replacement data item, restore the replaced sensitive data in the first data packet.

Thus, during source tracing, the original sensitive data may be traced on the basis of the replacement data and the recorded first replacement data item.

Method 2

The sensitive data processing device 102 may perform masking on the sensitive data in the first data packet by: performing masking operation on the sensitive data in the first data packet; and after performing masking operation on the sensitive data in the first data packet, further recording a first masking operation item (for example, the first masking operation item is recorded in a table), wherein the first masking operation item comprises: information about a masking operation method for performing masking operation on the sensitive data in the first data packet, sensitive data in the second data packet that has undergone masking operation, and correspondence between the two.

With method 2, the sensitive data processing device 102 performs masking operation on sensitive data to generate an item of sensitive data that has undergone masking operation, and records a first masking operation item of the sensitive data, the sensitive data that has undergone masking operation, and correspondence between the two, so that the original sensitive data can be subsequently traced on the basis of the sensitive data that has undergone masking operation.

In an embodiment, the sensitive data processing device 102 may, after sending a second data packet, further receive the second data packet returned by the control device 103, obtain sensitive data in the second data packet that has undergone masking operation, determine, on the basis of the obtained sensitive data that has undergone masking operation, the first masking operation item; and according to the first masking operation item, restore the replaced sensitive data in the first data packet.

Thus, during source tracing, the original sensitive data may be traced by performing inverse masking operation based on the replacement data and recorded first masking operation item.

[Masking Tag]

In an embodiment, the sensitive data processing device 102 may further generate a masking tag, wherein the masking tag is used to indicate whether the second data packet contains sensitive data that has undergone masking, or the masking tag is used to indicate the data type of sensitive data that has undergone masking in the second data packet, and send the masking tag to the control device 103. The data type may comprise, for example, IP address, username/password, bank account, phone number, ID card number, sensitive email address, sensitive file, sensitive configuration information, and sensitive command.

The masking tag is intended to indicate that the second data packet contains sensitive data that has undergone masking, and the control device 103 may, based on the masking tag, determine that the second data packet contains sensitive data that has undergone masking.

A masking tag, for example, may be implemented by methods including the following two methods:

Method 1

A masking tag is used to indicate that the second data packet contains sensitive data that has undergone masking (for example, N bits are reserved in a preset position of the second data packet, N being a positive integer; a value of the N-bit data indicates that the second data packet contains sensitive data that has undergone masking, and another value indicates that the second data packet does not contain sensitive data that has undergone masking).

Method 2

A masking tag is used to indicate the data type of sensitive data that has undergone masking in the second data packet (for example, the data type of sensitive data is email address type, username/password type, etc.). By sending the masking tag, the original sensitive data may be traced subsequently. The control device 103 may, after receiving the masking tag, further determine the type of sensitive data that has undergone masking, providing information to the control device 103 for performing possible safety-related processing. With method 2, leakage of sensitive data can be prevented, and the data type of sensitive data can be provided. Thus, even if the control device 103 does not know any specific content of sensitive data when performing a network safety event scan or network performance management, the device can obtain the data type of the sensitive data, facilitating network safety event scan or network performance management.

[Receiving and Sending of a Masking Tag]

Method 1

The sensitive data processing device 102 sends the masking tag and, when sending the masking tag, sends indication information 1036 for indicating the correspondence between the masking tag and a second data packet.

With method 1, accordingly, the control device 103 receives the second data packet, masking tag, and indication information 1036, and, based on the indication information 1036, determines that the masking tag corresponds to the second data packet, thereby determining that sensitive data in the second data packet has undergone masking.

Method 2

The sensitive data processing device 102 places the masking tag in a first position in the second data packet for sending, wherein the first position is a preset position in the sensitive data that has undergone masking in the second data packet.

With method 2, accordingly, the control device 103 obtains the masking tag from a first position of the second data packet, thereby determining that sensitive data in the second data packet has undergone masking.

In fact, the control device 103 may perform any type of processing, for example, performance statistics and network safety event monitoring, on the second data packet. In a possible scenario, the control device 103, by monitoring a second data packet (optionally, further comprising another data packet), determines that a network safety event, for example, intrusion by a hacker, falsification, infection with a virus, etc. has occurred. In addition, the control device 103, by a masking tag, determines that the second data packet contains sensitive data that has undergone masking. Thus, the control device 103 may return the second data packet to the sensitive data processing device 102, and notify the sensitive data processing device 102 that a network safety event has occurred. The sensitive data processing device 102 may restore the sensitive data in the second data packet, and notify the local client network 101 of an association of the original information that a network safety event has occurred in the second data packet. Thus, the local client network 101 can, in a timely manner, be notified of occurrence of a network safety event and handle it, for example, eliminating the network safety event, removing a virus, changing certain usernames/passwords, reporting the case to the police in a timely manner, etc.

The control device 103 may, based on a masking tag, determine that the second data packet contains sensitive data that has undergone masking, instead of directly obtaining sensitive data, further ensuring that no sensitive data is leaked.

Figure 1D:
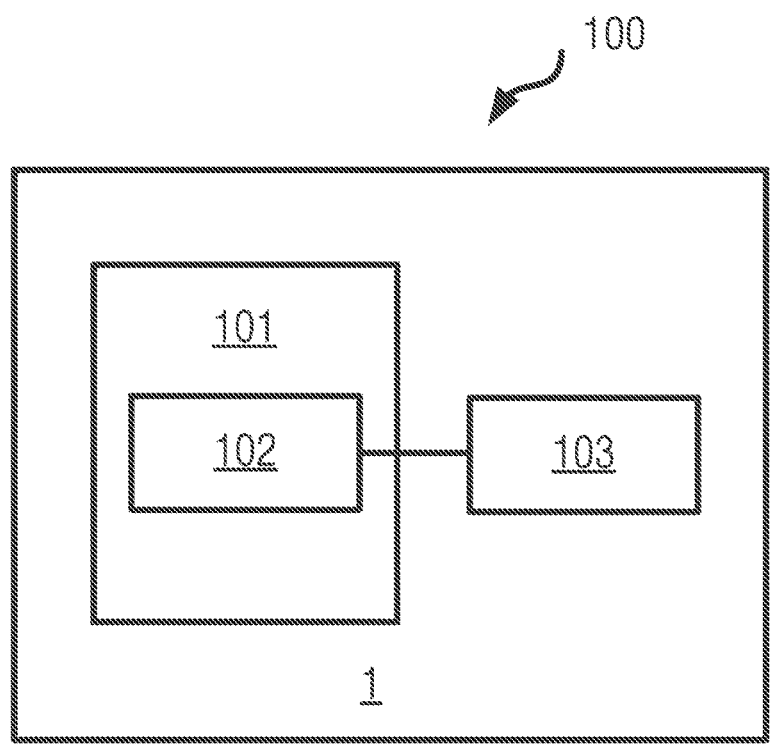

FIGS. 1B to 1D show different positions of the sensitive data processing device 102 and the control device 103, but operations on them are the same as described above. Therefore, the operations will not be provided again, and only the difference in position will be described.

As shown in FIG. 1B, the sensitive data processing device 102, different from that shown in FIG. 1A, is located on the server side 2; thus, leakage of sensitive data to the control device 103 on the server side 2 is prevented, and the processing load on the client side 1 is reduced.

As shown in FIG. 1C, the sensitive data processing device 102, different from that shown in FIG. 1A, is located in the local client network 101; this ensures that sensitive data in the local client network 101 is masked before leaving the local client network 101 so that it is not leaked.

As shown in FIG. 1D, the sensitive data processing device 102 and the control device 103, different from those shown in FIG. 1A, are located on the server side 1; however, the sensitive data processing device 102 is located in the local client network 101, while the control device 103 is located outside the local client network 101. Thus, various processing, such as network safety event monitoring, can be performed right on the client side, and this ensures that no sensitive data is leaked.

In the system processing system 100 shown in FIG. 1A to FIG. 1D, the sensitive data processing device 102 may filter sensitive data sent from the local client network 101 to the control device 103, thereby masking the sensitive data; thus, a user does not need to worry about leakage of any personal or commercial sensitive data, sent from the local client network 101, to the control device 103 or any other third party; a third party or, taken as an example herein, the control device 103 may also be able to perform certain control processing, for example, network safety monitoring, on the data packet in the local client network 101, to ensure network safety of the data packet, and, when a network safety event is detected, is notified of the existence of sensitive data in the data packet, in order to restore the sensitive data in the local client network 101.

FIG. 2 shows a block diagram for the internal units and modules of the data processing system 100 in which each embodiment of the present invention is applied, wherein FIG. 2 takes the system architecture shown in FIG. 1A as an example, and the control device 103 is configured to perform network safety monitoring.

As shown in FIG. 2, the sensitive data processing device 102 receives, from at least one client in the local client network 101, data and/or information, such as, 1) a network data stream 1011, for example, user data, entertainment data, commercial data, etc.;
2) a system log 1012, which may be obtained on the basis of a system log protocol;
3) system configuration data 1013;
4) network configuration data 1014; and
5) safety configuration data 1015, for configuring network safety event monitoring.

The sensitive data processing device 102 may comprise:

1) a data receiving unit 1026, for collecting and receiving data and information, for example, a first data packet, from at least one client in the local client network 101.

When obtaining a network data stream, a port of the sensitive data processing device 102 may be set to a mirror mode for mapping the network data stream to the port. The data receiving unit 1026 will be connected to the port and, through the port, obtains a network data stream.

If sensitive data mapping information and sensitive data positioning information is generated by the above-described method 2, the sensitive data processing device 102 generates the above-mentioned two types of information. Thus, the sensitive data processing device 102 may further comprise a sensitive data characteristic extraction unit 1021, a sensitive data type table 1029, and a sensitive data analysis unit 1023, wherein:

2) the sensitive data type table 1029 is configured to record the above-described sensitive data characteristic information;

The amount of sensitive data characteristic information may increase along with the increase in the amount of system and network applications. For example, when a new username/password format or a new industrial network protocol is used, new sensitive data characteristic information may be configured, or the original sensitive data characteristic information may be updated.

3) the sensitive data characteristic extraction unit 1021 is configured to, based on sensitive data characteristic information in the sensitive data type table 1029, determine whether a received data packet, for example, a third data packet, contains sensitive data;

4) the sensitive data analysis unit 1023 is configured to, when determining that the data packet contains sensitive data, generate sensitive data mapping information and sensitive data positioning information, and record it in the sensitive data mapping table 1028, thereby expanding and updating the sensitive data mapping table 1028.

The sensitive data characteristic extraction unit 1021 and the sensitive data analysis unit 1023 may be configured to, based on the sensitive data type table 1029, self-learn sensitive data from a data packet, for example, a third data packet, received by the data receiving unit 1026, thereby expanding and updating the sensitive data mapping table 1028. The sensitive data characteristic extraction unit 1021 may filter a data packet that has the characteristic described by the sensitive data characteristic information configured in the sensitive data type table 1029, and extract, from the data packet, data having the characteristic as sensitive data. The sensitive data analysis unit 1023 is configured to analyze and learn extracted sensitive data, thereby finding other characteristics of the sensitive data, for example, based on the sensitive data, generating an item of sensitive data mapping information and an item of sensitive data positioning information that corresponds to the sensitive data mapping information, thereby adding a mapping table entry to the sensitive data mapping table 1028, the added mapping table entry recording the sensitive data mapping information, the sensitive data positioning information, and correspondence between the two.

If the sensitive data processing device 102, by the above-described method 1, receives sensitive data mapping information and sensitive data positioning information from the control device 103, then the sensitive data type table 1029, the sensitive data characteristic extraction unit 1021, and the sensitive data analysis unit 1023 may be located in the control device 103; the sensitive data characteristic extraction unit 1021 processes a third data packet from a second safe communication module 1033; for example, if the third data packet contains no masking tag or contains a masking tag indicating that the third data packet has not undergone masking, while it is determined, on the basis of the sensitive data characteristic information defined in the sensitive data type table 1029, that the third data packet contains sensitive data, then the data is sent to the sensitive data analysis unit 1023 to determine the sensitive data mapping information and sensitive data positioning information that correspond to the sensitive data. The sensitive data analysis unit 1023, by the second safe communication module 1033, sends the determined sensitive data mapping information and sensitive data positioning information to the sensitive data processing device 102. The sensitive data processing device 102 records, in the sensitive data mapping table 1028, the received sensitive data mapping information, sensitive data positioning information, and correspondence between the two.

The sensitive data processing device 102 may further comprise:

5) a sensitive data determination unit 1022, for quickly determining sensitive data in a data packet based on the sensitive data mapping table 1028;

6) a masking unit 1024, for performing masking on sensitive data in a first data packet.

For example, by the above-described method 1, sensitive data in the first data packet is replaced. Optionally, after the replacement, a first replacement data item is recorded, for example, recording the first replacement data item in a table, the first replacement data item comprising: replaced sensitive data in the first data packet, replacement data used to replace sensitive data in the first data packet, and correspondence between the two.

Alternatively, by the above-described method 2, masking operation is performed on the sensitive data in the first data packet, and the original sensitive data is replaced with the sensitive data that has undergone masking. Optionally, after masking, a first masking operation item is recorded, the first masking operation item comprising: information about a masking operation method for performing masking operation on the sensitive data in the first data packet, sensitive data in the second data packet that has undergone masking operation, and correspondence between the two.

The masking unit 1024, after performing masking on a first data packet, generates a second data packet, and then sends it to a first safe communication module 1027.

The sensitive data processing device 102 may further comprise:

7) a first safe communication module 1027, for sending a second data packet, sourced from the masking unit 1024, from the local client network 101 to the control device 103.

Further, the sensitive data processing device 102 may, by the data receiving unit 1026, capture network stream data and perform a basic network safety scan. The sensitive data processing device 102 may, from captured network stream data, filter out known malicious stream data and determined normal stream data to obtain suspicious network stream data, and send the obtained suspicious network stream data to the control device 103. In the example shown in FIG. 2, the control device 103 is configured to perform network safety monitoring, capable of performing network safety event analysis on suspicious network stream data from the sensitive data processing device 102.

Alternatively, the sensitive data processing device 102 may also send all captured network stream data to the control device 103 for network safety event analysis.

In either of the above-mentioned cases, the sensitive data processing device 102 may, before sending any network stream data to the control device 103, perform masking on the sensitive data therein by the above-described method, thereby ensuring that no sensitive data is leaked to any third-party device outside the local client network 101.

The sensitive data processing device 102 may further comprise:

8) an event handling unit 1025, configured to, by the first safe communication module 1027, receive the second data packet returned from the control device 103; obtain replacement data in the second data packet that is used to replace sensitive data in the first data packet; determine the first replacement data item based on the obtained replacement data; and, according to the first replacement data item, restore the replaced sensitive data in the first data packet.

In another embodiment, alternatively, the event handling unit 1025 may be configured to, by the first safe communication module 1027, receive the second data packet returned from the control device 103; obtain sensitive data in the second data packet that has undergone masking operation, determine, on the basis of the obtained sensitive data that has undergone masking operation, the first masking operation item; and according to the masking operation item, restore the replaced sensitive data in the first data packet.

The control device 103 may comprise:

1) A second safe communication module 1033, configured to receive a second data packet from the sensitive data processing device 102 and, optionally, further configured to receive the above-mentioned indication information 1036 (the indication information 1036 indicates the correspondence between a second data packet and a masking tag). Optimally, the second safe communication module 1033 may further return a second data packet to the sensitive data processing device 102.

2) A sensitive data positioning unit 1032, configured to, based on the indication information 1036, determine that a masking tag corresponds to a second data packet, or configured to obtain the masking tag in a first position of the second data packet, wherein the first position is a preset position in the sensitive data that has undergone masking in the second data packet.

3) A network safety monitoring unit 1031, configured to, based on a network safety event database 1035, perform network safety event monitoring on a second data packet from the sensitive data processing device 102. For example, a network safety event may be detected on the basis of a relevancy analysis, behavioral data mining, etc. An obtained monitoring result of a network safety event may be stored in the network safety event database 1035.

4) A safety event sensitive data querying unit 1034, configured to generate a request for a safety event notification and sensitive data query, and send the request to the sensitive data processing device 102 by the second safe communication module 1033. The notification and request may comprise a masking tag corresponding to a second data packet and/or data in the second data packet that has undergone masking, or the second data packet may also be returned directly. The notification and request may be used to locate an attack object, an attack source, etc. The event handling unit 1025 in the sensitive data processing device 102 may restore sensitive data and locate an attack object, an attack source, etc. For example, in the event of theft of a username or password or an event of insertion of a Flash drive to infect a target system with a virus, the sensitive data processing device 102 performs masking on the username and password in a first data packet as sensitive data and then generates a second data packet. The event handling unit 1025, after receiving the returned second data packet, restores the sensitive data to locate the attack object, thereby handling the attack event.

Certainly, the sequence in which the network safety monitoring unit 1031 and the sensitive data positioning unit 1032 perform processing may be changed. A network safety event may be detected first, and then whether a data packet contains sensitive data that has undergone masking may be determined. The reason is that if no network safety event has occurred, there may be no need to position sensitive data. Whether a data packet related to a network safety event contains sensitive data that has undergone masking may need to be determined only when a network safety event has occurred. Thus, the amount of data to be processed can be reduced to speed up the processing. Certainly, whether a data packet contains sensitive data that has undergone masking may be determined first, and then network safety event monitoring may be performed.

The sensitive data mapping table 1028 is located in the sensitive data processing device 102, and the control device 103 will not know the sensitive data mapping table 1028 related to the substantial content of sensitive data. This also ensures that no sensitive data of a user will be leaked.

Certainly, the above-described embodiments are specific examples of handling sensitive data; however, the present invention is not limited to use in network safety, and the present invention is not limited to comprising only the above-described units, etc. Embodiments of more general data processing methods and apparatuses according to the present invention will be described below.

Method Embodiments

Figure 3:
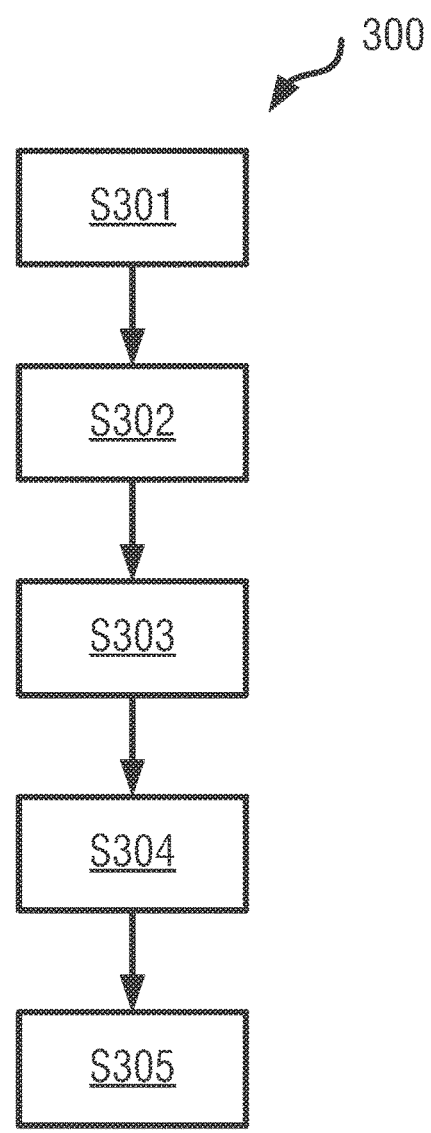
FIG. 3 shows a flowchart of a data processing method according to an embodiment of the present invention.

FIG. 3 shows a flowchart of a data processing method according to an embodiment of the present invention.

The data processing method 300 comprises: step S301 of obtaining a first data packet in the local client network 101; step S302 of determining sensitive data in the first data packet; step S303 of performing masking on the sensitive data in the first data packet so that the first data packet generates a second data packet; and step S304 of sending the generated second data packet.

Thus, masking may be performed on sensitive data; even if a data packet that has undergone masking is obtained by a third-party device, the sensitive data in the packet, which has undergone masking, is not easily decrypted by the third-party device, and so leakage of sensitive data is avoided.

In an embodiment, step S302 for determining sensitive data in the first data packet comprises: from a configured sensitive data mapping table 1028, determining a first mapping table entry that matches the sensitive data mapping information of the first data packet, and, based on the sensitive data positioning information recorded in the first mapping table entry, determining sensitive data in the first data packet, wherein a mapping table entry in the sensitive data mapping table 1028 records an item of sensitive data mapping information, an item of sensitive data positioning information, and correspondence between the two, wherein the sensitive data mapping information comprises at least one type of the following information: protocol type of a data packet, protocol version number of a data packet, message type of a message contained in a data packet, field tag of a field contained in a data packet, and keyword information for determining sensitive data; the sensitive data positioning information indicates a position of sensitive data in a data packet containing the sensitive data mapping information.

By the sensitive data mapping information in the sensitive data mapping table 1028, it can be determined whether the first data packet contains sensitive data; in addition, based on the sensitive data positioning information recorded in the mapping table entry, sensitive data may be quickly positioned in the first data packet, and the sensitive data positioning information may comprise a definite position, a position characteristic, field tag information, and other position-indicating information.

In an embodiment, if, from a configured sensitive data mapping table 1028, it is determined that no first mapping table entry exists that matches the sensitive data mapping information in the first data packet, masking is not required.

However, in another embodiment, step S302 for determining sensitive data in the first data packet comprises: if, from a configured sensitive data mapping table 1028, it is determined that no first mapping table entry exists that matches the sensitive data mapping information in the first data packet, then, based on the sensitive data characteristic information defined in a sensitive data type table 1029, determining whether the first data packet contains sensitive data that has the characteristic described by the sensitive data characteristic information. If yes, then the determined sensitive data that has the sensitive data characteristic information is used as the sensitive data in the first data packet. In addition, based on the sensitive data, an item of sensitive data mapping information and an item of sensitive data positioning information that corresponds to the sensitive data mapping information may also be generated, and a mapping table entry may be added to the sensitive data mapping table 1028, the added mapping table entry recording the sensitive data mapping information received, the sensitive data positioning information received, and correspondence between the two.

Note that, in the method 300, determination of sensitive data and generation of sensitive data mapping information and sensitive data positioning information may be performed by the sensitive data processing device 102 or by the control device 103, which is not limited herein.

In an embodiment, performing masking on sensitive data in the first data packet comprises: replacing sensitive data in the first data packet, wherein, after replacing sensitive data in the first data packet, the method further comprises: recording a first replacement data item (for example, recording the first replacement data item in a table), wherein the first replacement data item comprises: replaced sensitive data in the first data packet, replacement data used to replace sensitive data in the first data packet, and correspondence between the two.

In an embodiment, after step S304 of sending the generated second data packet, the method further comprises: receiving the second data packet returned; obtaining replacement data in the second data packet that is used to replace sensitive data in the first data packet; determining the first replacement data item based on the obtained replacement data; and, according to the first replacement data item, restoring the replaced sensitive data in the first data packet.

Thus, during source tracing, the original sensitive data may be traced on the basis of replacement data and the first replacement data item recorded in the sensitive data mapping table 1028.

In an embodiment, performing masking on sensitive data in the first data packet comprises: performing masking operation on sensitive data in the first data packet, wherein, after performing masking on sensitive data in the first data packet, the prevent invention further comprises: recording a first masking operation item, wherein the first masking operation item comprises: information about a masking operation method for performing masking operation on the sensitive data in the first data packet, sensitive data in the second data packet that has undergone masking operation, and correspondence between the two.

This is the second solution for masking. In other words, masking operation is performed on sensitive data to generate an item of sensitive data that has undergone masking operation, and a sensitive data mapping table 1028 records a first masking operation item of the sensitive data, the sensitive data that has undergone masking operation, and correspondence between the two, so that the original sensitive data can be subsequently traced on the basis of the sensitive data that has undergone masking operation.

In an embodiment, after step S304 of sending the generated second data packet, the method 300 further comprises: receiving the second data packet returned; obtaining sensitive data in the second data packet that has undergone masking operation, determining, on the basis of the obtained sensitive data that has undergone masking operation, the first masking operation item; and according to the masking operation item, restoring the replaced sensitive data in the first data packet.

Thus, during source tracing, the original sensitive data may be traced by performing inverse masking operation based on the replacement data and the first masking operation item recorded in the sensitive data mapping table 1028.

In an embodiment, the method 300 further comprises: generating a masking tag, wherein the masking tag is used to indicate whether the second data packet contains sensitive data that has undergone masking, or the masking tag is used to indicate the data type of sensitive data that has undergone masking in the second data packet; and sending the masking tag.

The masking tag is intended to indicate that the second data packet contains sensitive data that has undergone masking, and a device or apparatus, after receiving the second data packet, may, based on the masking tag, determine that the second data packet contains sensitive data that has undergone masking. A masking tag, for example, takes one of two forms: 1. A masking tag is used to indicate that the second data packet contains sensitive data that has undergone masking; 2. A masking tag is used to indicate the data type of sensitive data that has undergone masking in the second data packet (for example, the data type of sensitive data is email address type, username/password type, etc.). By sending the masking tag, the original sensitive data may be traced subsequently.

In an embodiment, sending the masking tag comprises: sending the masking tag and, when sending the masking tag, sending indication information 1036 for indicating the correspondence between the masking tag and a second data packet, or placing the masking tag in a first position in the second data packet for sending, wherein the first position is a preset position in the sensitive data that has undergone masking in the second data packet.

Thus, by the received indication information 1036 that indicates the correspondence between the masking tag and the second data packet, as well as the masking tag, it may be determined that the corresponding second data packet contains sensitive data that has undergone masking; alternatively, by a masking tag detected in the present position, it may be determined that the second data packet contains sensitive data that has undergone masking.

For other optional modes of implementing the method, refer to the implementation of the above-described sensitive data processing device 102, and similar descriptions will not be provided again.

Figure 5:
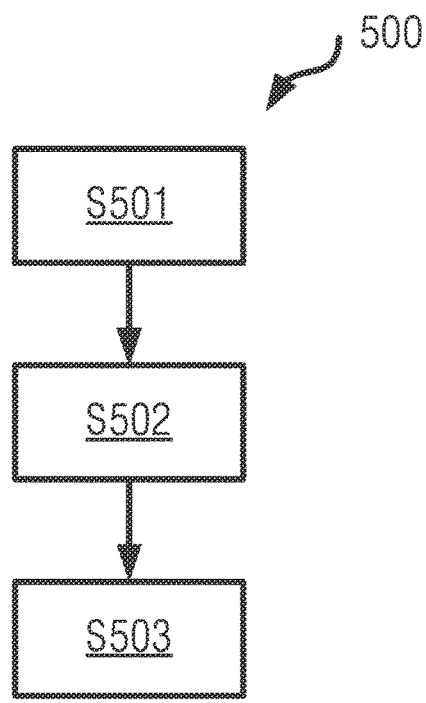
FIG. 5 shows a flowchart of a data processing method for data packets in a local client network according to an embodiment of the present invention.

FIG. 5 shows a flowchart of a data processing method 500 according to an embodiment of the present invention.

The data processing method 500 comprises: step S501 of receiving a second data packet in the local client network 101; step S502 of obtaining a masking tag, wherein the masking tag is used to indicate that the second data packet contains sensitive data that has undergone masking; and step S503 of determining, based on the masking tag, that the second data packet contains sensitive data that has undergone masking.

Thus, when a second data packet is received, it may be determined, using a masking tag, whether the data packet contains sensitive data that has undergone masking; this prevents treating a data packet that has undergone masking as a data packet that contains no sensitive data, while allowing the sensitive data to be traced.

In an alternative embodiment, the data processing method 500 comprises: step S501 of receiving a second data packet in the local client network 101; step S502 of obtaining a masking tag, wherein the masking tag is used to indicate the data type of sensitive data in the second data packet that has undergone masking; and step S503 of determining, based on the masking tag, the data type of sensitive data in the second data packet that has undergone masking.

Thus, when a second data packet is received, using a masking tag, the sensitive data type of sensitive data in the data packet that has undergone masking may be determined; this prevents treating a data packet that has undergone masking as a data packet that contains no sensitive data, while allowing the sensitive data to be traced on the basis of the sensitive data type.

In an embodiment, step S502 of obtaining a masking tag comprises: receiving the masking tag and an item of indication information 1036, the indication information 1036 indicating the correspondence between the masking tag and a second data packet, determining, on the basis of the indication information 1036, that the masking tag corresponds to the second data packet; or, obtaining the masking tag from a first position of the second data packet, wherein the first position is a preset position in the sensitive data that has undergone masking in the second data packet.

By the corresponding masking tag and the indication information 1036, the corresponding second data packet may be determined, or a masking tag may be obtained from a preset position; this allows a reduction in the costs of searching for masking tags one by one and positioning a second data packet containing sensitive data that has undergone masking. In addition, since the data processing is based on the indication information 1036, instead of on the sensitive data mapping table 1028, it is guaranteed that the original sensitive data cannot be viewed directly from the sensitive data mapping table 1028, further ensuring that no sensitive data will be leaked.

In an embodiment, the data processing method 500 further comprises: sending, to a sensitive data processing device 102, an item of sensitive data mapping information and an item of sensitive data positioning information, indicating correspondence between the two, the sensitive data processing device 102 being configured to process the sensitive data in a first data packet in the local client network 101, thereby generating the second data packet, wherein an item of sensitive data mapping information and an item of sensitive data positioning information that corresponds to the sensitive data mapping information are used by the sensitive data processing device 102 to determine the sensitive data contained in a data packet, wherein the sensitive data mapping information comprises at least one type of the following information: protocol type of a data packet, protocol version number of a data packet, message type of a message contained in a data packet, field tag of a field contained in a data packet, keyword information for determining sensitive data, etc.; the sensitive data positioning information indicates a position of sensitive data in a data packet containing the sensitive data mapping information.

If sensitive data mapping information and sensitive data positioning information are already stored, the method 500 may further send sensitive data mapping information and sensitive data positioning information to the sensitive data processing device 102; such information does not need to be stored in the sensitive data processing device 102, and the storage space and calculation load of the sensitive data processing device 102 can be saved and reduced, respectively.

In an embodiment, before sending the sensitive data mapping information to the sensitive data processing device 102, the method further comprises: receiving a third data packet from the local client network 101; determining, based on an item of configured sensitive data characteristic information, that the third data packet contains sensitive data; determining that the sensitive data contained in the third data packet has not undergone masking; generating, on the basis of the sensitive data, the sensitive data mapping information of the third data packet and sensitive data positioning information corresponding to the sensitive data mapping information; sending the obtained sensitive data mapping information to the sensitive data processing device 102 and, corresponding to the sent sensitive data mapping information, sending the generated sensitive data positioning information to the sensitive data processing device 102.

Thus, the data processing method 500 may further, when no sensitive data mapping information or sensitive data positioning information has been stored, based on configured sensitive data characteristic information, determine sensitive data and generate sensitive data mapping information and sensitive data positioning information; this eliminates the need to perform the processing at the sensitive data processing device 102, thus reducing the calculation load of the sensitive data processing device 102.

Thus, based on an embodiment of the present invention, a user does not need to worry about leakage of any personal or commercial sensitive data, while control and processing of data in the local client network 101 is ensured.

For other optional modes of implementing the method, refer to the above-described implementation of the control device 103, and similar descriptions will not be provided again.

Device Embodiment

Figure 6:
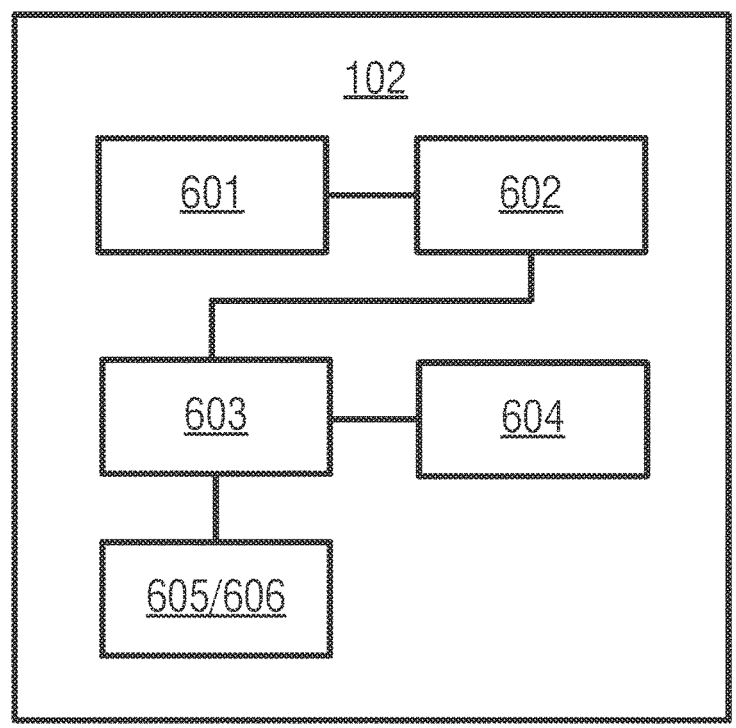
FIG. 6 shows a block diagram for a sensitive data processing device according to an embodiment of the present invention.

FIG. 6 shows a block diagram for a sensitive data processing device 102 according to an embodiment of the present invention.

The sensitive data processing device 102 comprises: an acquiring component 601, configured to obtain a first data packet from a local client network 101; a determining component 602, configured to determine sensitive data in the first data packet; a generating component 603, configured to perform masking on the sensitive data in the first data packet so that the first data packet generates a second data packet; and a sending component 604, configured to send the second data packet generated.

Thus, masking may be performed on sensitive data; even if a data packet that has undergone masking is obtained by a third-party device, the sensitive data in the packet, which has undergone masking, is not easily decrypted by the third-party device, and so leakage of sensitive data is avoided.

In an embodiment, the determining component 602 is specifically configured to: from a configured sensitive data mapping table 1028, determine a first mapping table entry that matches the sensitive data mapping information of the first data packet, and, based on the sensitive data positioning information recorded in the first mapping table entry, determine sensitive data in the first data packet, wherein a mapping table entry in the sensitive data mapping table 1028 records an item of sensitive data mapping information, an item of sensitive data positioning information, and correspondence between the two, wherein the sensitive data mapping information comprises at least one type of the following information: protocol type of a data packet, protocol version number of a data packet, message type of a message contained in a data packet, field tag of a field contained in a data packet, keyword information for determining sensitive data, etc.

The sensitive data positioning information indicates a position of sensitive data in a data packet containing the sensitive data mapping information.

Thus, based on the sensitive data mapping information in the sensitive data mapping table 1028, it is possible to determine whether the first data packet contains sensitive data and, based on the sensitive data positioning information recorded in the mapping table entry, quickly locate sensitive data in the first data packet.

In an embodiment, the acquiring component 601 is further configured to: receive an item of sensitive data mapping information and an item of sensitive data positioning information that corresponds to the sensitive data mapping information, the sensitive data mapping information received not having been configured; the determining component 602 is further configured to: add a mapping table entry to the sensitive data mapping table 1028, the added mapping table entry recording the sensitive data mapping information received and the sensitive data positioning information received by the acquiring component 601, and correspondence between the two.

Thus, the sensitive data mapping table 1028 may be expanded, and the expanded sensitive data mapping table 1028 may then be used to determine sensitive data and perform masking more extensively and accurately, thereby further ensuring that no leakage of sensitive data occurs.

In an embodiment, the generating component 603 is specifically configured to: perform masking on the sensitive data in the first data packet by replacing the sensitive data in the first data packet; the generating component 603 is further configured to: after replacing the sensitive data in the first data packet, record a first replacement data item (for example, recording the first replacement data item in a table), wherein the first replacement data item comprises: replaced sensitive data in the first data packet, replacement data used to replace sensitive data in the first data packet, and correspondence between the two.

This is the first solution for masking. In other words, an item of sensitive data is replaced with an item of replacement data, and a first replacement data item of the sensitive data, the replacement data, and correspondence between the two is recorded in the sensitive data mapping table 1028, so that the original sensitive data can be subsequently traced on the basis of the replacement data.

In an embodiment, the sensitive data processing device 102 further comprises: a first restoring component 605, configured to: receive the second data packet returned; obtain replacement data in the second data packet that is used to replace sensitive data in the first data packet; determine the first replacement data item based on the obtained replacement data; and, according to the first replacement data item, restore the replaced sensitive data in the first data packet.

Thus, during source tracing, the original sensitive data may be traced on the basis of the replacement data and the recorded first replacement data item.

In an embodiment, the generating component 603 is specifically configured to, by performing masking operation on sensitive data in the first data packet, perform masking on sensitive data in the first data packet; the generating component 603 is further configured to: after performing masking on sensitive data in the first data packet, record a first masking operation item, wherein the first masking operation item comprises: information about a masking operation method for performing masking operation on the sensitive data in the first data packet, sensitive data in the second data packet that has undergone masking operation, and correspondence between the two.

This is the second solution for masking. In other words, masking operation is performed on sensitive data to generate an item of sensitive data that has undergone masking operation, and a sensitive data mapping table 1028 records a first masking operation item of the sensitive data, the sensitive data that has undergone masking operation, and correspondence between the two, so that the original sensitive data can be subsequently traced on the basis of the sensitive data that has undergone masking operation.

In an embodiment, the sensitive data processing device 102 further comprises a second restoring component 606 (in place of the first restoring component 605), configured to: receive the second data packet returned; obtain sensitive data in the second data packet that has undergone masking operation, determine, on the basis of the obtained sensitive data that has undergone masking operation, the first masking operation item; and according to the masking operation item, restore the replaced sensitive data in the first data packet.

Thus, during source tracing, the original sensitive data may be traced by performing inverse masking operation based on the replacement data and recorded first masking operation item.

In an embodiment, the generating component 603 is further configured to: generate a masking tag, wherein the masking tag is used to indicate whether the second data packet contains sensitive data that has undergone masking, or the masking tag is used to indicate the data type of sensitive data that has undergone masking in the second data packet; the sending component 604 is further configured to: send the masking tag.

By sending the masking tag, the original sensitive data may be traced subsequently.

In an embodiment, the sending component 604 is specifically configured to: send the masking tag and, when sending the masking tag, send indication information 1036 for indicating the correspondence between the masking tag and a second data packet, or place the masking tag in a first position in the second data packet for sending, wherein the first position is a preset position in the sensitive data that has undergone masking in the second data packet.

Thus, optionally, by the received indication information 1036 that indicates the correspondence between the masking tag and the second data packet, as well as the masking tag, it may be determined that the corresponding second data packet contains sensitive data that has undergone masking; alternatively, by a masking tag detected in the present position, it may be determined that the second data packet contains sensitive data that has undergone masking.

Figure 7:
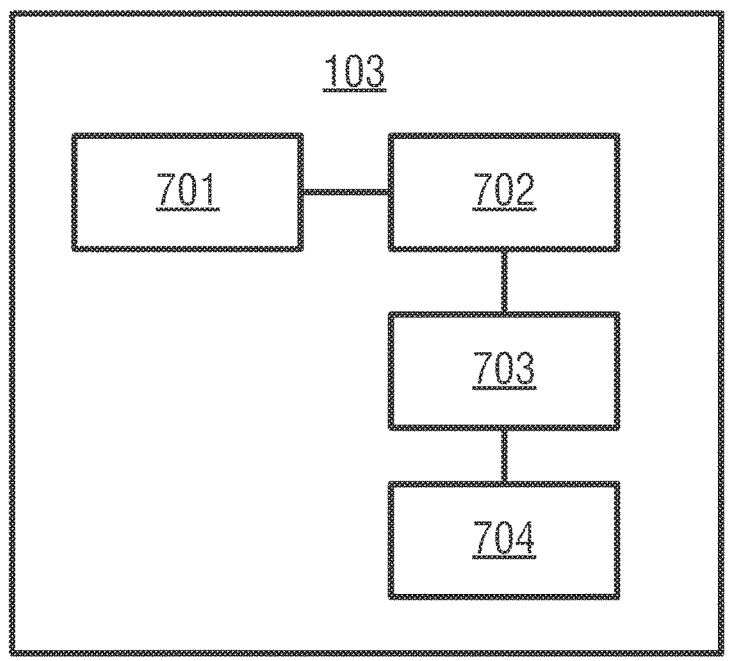
FIG. 7 shows a block diagram for a control device according to an embodiment of the present invention.

FIG. 7 shows a block diagram for a control device 103 according to an embodiment of the present invention.

In one aspect, a control device 103 is provided, comprising:
a receiving component 701, configured to receive a second data packet from a local client network 101;
an acquiring component 702, configured to obtain a masking tag; and
a determining component 703,
wherein the masking tag is used to indicate the data type of sensitive data that has undergone masking in the second data packet, and the determining component 703 is configured to determine, based on the masking tag, the data type of sensitive data in the second data packet that has undergone masking; alternatively, the masking tag is used to indicate that the second data packet contains sensitive data that has undergone masking, and the determining component 703 is configured to determine, based on the masking tag, that the second data packet contains sensitive data that has undergone masking.

In an embodiment, the acquiring component 702 is further configured to: receive the masking tag and an item of indication information 1036, the indication information 1036 indicating the correspondence between the masking tag and a second data packet, determine, on the basis of the indication information 1036, that the masking tag corresponds to the second data packet; or, obtain the masking tag from a first position of the second data packet, wherein the first position is a preset position in the sensitive data that has undergone masking in the second data packet.

By the corresponding masking tag and the indication information 1036, the corresponding second data packet may be determined, or a masking tag may be obtained from a preset position; this allows a reduction in the costs of searching for masking tags one by one and positioning a second data packet containing sensitive data that has undergone masking. In addition, since the data processing is based on the indication information 1036, instead of on the sensitive data mapping table 1028, it is guaranteed that the original sensitive data cannot be viewed directly from the sensitive data mapping table 1028, further ensuring that no sensitive data will be leaked.

In an embodiment, the control device 103 further comprises: a sending component 704, configured to: send, to a sensitive data processing device 600, an item of sensitive data mapping information and an item of sensitive data positioning information, indicating correspondence between the two, the sensitive data processing device 600 being configured to process the sensitive data in a first data packet in the local client network 101, thereby generating the second data packet, wherein an item of sensitive data mapping information and an item of sensitive data positioning information that corresponds to the sensitive data mapping information are used by the sensitive data processing device 600 to determine the sensitive data contained in a data packet, wherein the sensitive data mapping information comprises at least one type of the following information: protocol type of a data packet, protocol version number of a data packet, message type of a message contained in a data packet, field tag of a field contained in a data packet, and keyword information for determining sensitive data; the sensitive data positioning information indicates a position of sensitive data in a data packet containing the sensitive data mapping information.

If sensitive data mapping information and sensitive data positioning information are already stored, the method may further send sensitive data mapping information and sensitive data positioning information to the sensitive data processing device 600; such information does not need to be stored in the sensitive data processing device 600, and the storage space and calculation load of the sensitive data processing device 600 can be saved and reduced, respectively.

In an embodiment, the receiving component 701 is further configured to: before the sending component 704 sends the sensitive data mapping information to the sensitive data processing device 102, receive a third data packet from the local client network 101; the determining component 703 is further configured to: determine, based on an item of configured sensitive data characteristic information, that the third data packet contains sensitive data; determine that the sensitive data contained in the third data packet has not undergone masking; obtain the sensitive data mapping information of the third data packet; and generate the sensitive data positioning information corresponding to the sensitive data mapping information in the third data packet.

Thus, it is further possible to, when no sensitive data mapping information or sensitive data positioning information has been stored, based on configured sensitive data characteristic information, determine sensitive data and generate sensitive data mapping information and sensitive data positioning information; this eliminates the need to complete such generation at the sensitive data processing device 102, thus reducing the calculation load of the sensitive data processing device 102.

For other optional modes of implementing the control device 103 shown in FIG. 7, refer to the above-described implementation of the control device 103, and similar descriptions will not be provided again.

Figure 8:
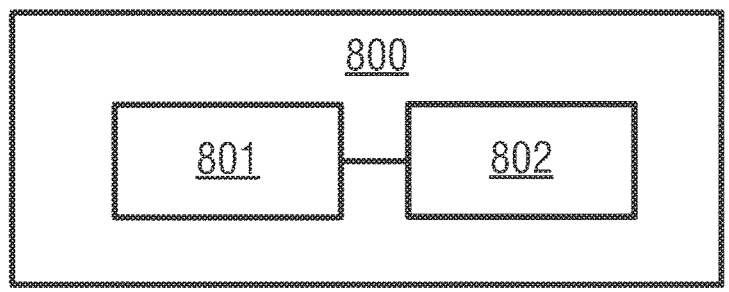
FIG. 8 shows a block diagram for a sensitive data processing device according to another embodiment of the present invention.

FIG. 8 shows a block diagram for a sensitive data processing device 102 according to another embodiment of the present invention.

In one aspect, a sensitive data processing device 102 is provided, comprising: at least one processor 801; and at least one memory 802, coupled to the at least one processor 801, wherein the at least one memory 802 further stores a computer-executable instruction that, when executed by the at least one processor 801, causes the sensitive data processing device 102 to implement the data processing method.

For other optional modes of implementing the sensitive data processing device 102, refer to the above-described implementation of the sensitive data processing device 102, and similar descriptions will not be provided again.

Figure 9:
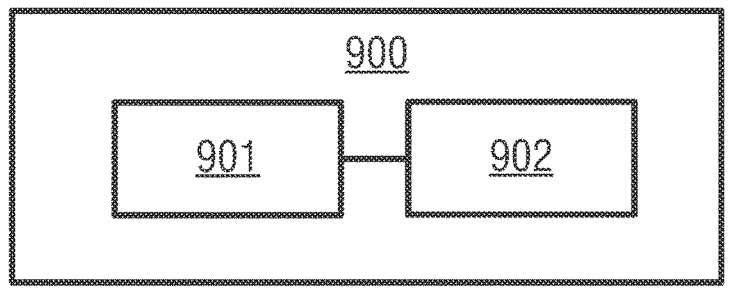
FIG. 9 shows a block diagram for a control device according to another embodiment of the present invention.

FIG. 9 shows a block diagram for a control device 103 according to another embodiment of the present invention.

In one aspect, a control device 103 is provided, comprising: at least one processor 901; and at least one memory 902, coupled to the at least one processor 901, wherein the at least one memory 902 further stores a computer-executable instruction that, when executed by the at least one processor 901, causes the sensitive data processing device 103 to implement the data processing method.

For other optional modes of implementing the control device 103, refer to the above-described implementation of the control device 103, and similar descriptions will not be provided again.

In each embodiment of the present invention, a solution is proposed for tagging sensitive data, determining sensitive data from data in a local client network based on a sensitive data type table or a sensitive data mapping table, and performing masking. Generally, for example, the sensitive data type table stores data modes related to sensitive data. The sensitive data mapping table stores collected information that is related to sensitive data, protocol, position, keyword, attribute, etc., and sensitive data that has undergone masking. The above-mentioned position is actually an amount of deviation of sensitive data located in target data, for example, a position of a sensitive data field in the header or payload of a network data packet.

An embodiment of the present invention may self-adaptively learn and update data modes, and may learn more data modes from new sensitive data, for example, at least one application layer protocol type of the data packet containing the sensitive data, a position of the sensitive data in the data packet, at least one keyword in the sensitive data, at least one specific data format mode of sensitive data, data length, and a sensitive field value of a protocol field, thereby recording such data modes in a sensitive data mapping table and allowing future detection of sensitive data based on a sensitive data mapping table alone. In other words, a sensitive data mapping table may be learned and updated from a sensitive data type table, and sensitive data can be detected subsequently on the basis of a sensitive data mapping table alone; thus, detection of sensitive data is accelerated, and the calculation load and calculation time are decreased.

Sensitive data collected from a client system or network will be masked. Therefore, a client does not need to worry about leakage of any personal or commercial sensitive data. In addition, data similar to original data may be collected, and such data may be transferred from the client side 1 to a central network safety event monitoring center. Further, analysis sent from a central network safety event monitoring center may be processed in the same way as original data that contains sensitive data is processed. If any new application or network protocol is detected in a monitored environment, an embodiment of the present invention may also learn such new data and output a new data mode for tagging sensitive data.

An embodiment of the present invention may, based on relevancy analysis, behavioral data mining, etc., detect an abnormal behavior or attack event. An obtained monitoring result of a network safety event may be stored in a network safety event database. For locating an attack object, an attack source, or any processing related to sensitive data that is based on an attack, the control device may further comprise sensitive data query of a safety event, configured to generate a request for querying a safety event notification and sensitive data. Such a request may also be sent to a sensitive data processing device in a client network, so that an event processing unit in the sensitive data processing device may query and locate an attacked object, a victim, or an item of relevant sensitive data, namely, main body of a network safety event, for example, a client or user in the event of theft of a username or password or insertion of a Flash drive to infect a target system with a virus. Thus, a user may handle safety events based on safety event monitoring results about attacks, and may restore the original sensitive data based on a sensitive data mapping table.

Computer Storage Medium

The present invention further provides a computer storage medium, storing an instruction for causing a machine to implement a method for examining the program code described herein. Specifically, a system or apparatus equipped with a storage medium may be provided, wherein the storage medium stores software program code for implementing the functions of any one of the above-described embodiments, and a computer or CPU or MPU of the system or apparatus is caused to read and execute the program code stored in the storage medium.

In such a case, program code read from a storage medium may by itself implement the functions of any one of the above-described embodiments, and so program code and a storage medium storing the program code constitute part of the present invention.

Examples of a storage medium for providing program code include floppy disk, hard disk, magneto-optical disk, optical disk (for example, CD-ROM, CD-R, CD-RW, DVD-ROM, DVD-RAM, DVD-RW, or DVD+RW), magnetic tape, non-volatile memory card, and ROM. Optionally, program code may be downloaded from a computer of the control device 103 via a communication network.

In addition, it should be made clear that functions of any one of the above-described embodiments may be implemented not only by executing program code read by a computer but also by causing, according to the instruction of program code, an operating system, etc. running on a computer to complete part or all of actual operations.

In addition, it can be understood that functions of any one of the above-described embodiments may be implemented by writing program code read from a storage medium to a memory disposed in an expansion board inserted into a computer or to a memory disposed in an expansion unit connected to a computer, and then by, according to the instruction of program code, causing a CPU, etc. installed on the expansion board or expansion unit to execute part and all of actual operations.

It should be noted that not all the steps or modules in the above-described flows and system structural diagrams are required, and certain steps or modules may be ignored as needed. The sequence of executing steps is not fixed and may be adjusted as needed. The system structures described in the above embodiments may be physical structures or logical structures; in other words, certain modules may be implemented as the same physical entity, or certain modules may be implemented as a plurality of physical entities separately, or certain modules may be jointly implemented by certain components in a plurality of standalone devices.

In each of the above embodiments, a hardware unit may be implemented mechanically or electrically. For example, a hardware unit may comprise a permanently dedicated circuit or logic, for example, a special processor, an FPGA, or an ASIC, for completing corresponding operations. A hardware unit may further comprise a programmable logic or circuit, for example, a general-purpose processor or any other programmable processor, and temporary setting may be made by software to complete corresponding operations. A specific implementation mode, for example, a mechanical mode, or a dedicated permanent circuit, or a temporarily set circuit, may be determined on the basis of cost and time considerations.

While the present invention has been illustrated and described in detail above with reference to the drawings and preferred embodiments, the present invention is not limited to these disclosed embodiments. Based on the above-described embodiments, those of ordinary skill in the art may know that more embodiments of the present invention may be obtained by combining the code examination in the above-described embodiments and that these embodiments also fall into the protection scope of the present invention.

Certainly, the above-described specific embodiments are only exemplary but not limiting, and those of ordinary skill in the art may, based on the spirit of the present invention, merge and combine certain steps and devices in each of the embodiments separately described above, thereby achieving the effects of the present invention; such merged and combined embodiments also fall into the scope of the present invention, and such mergings and combinations will not be described one by one herein.

Note that the benefits, advantages, effects, etc. mentioned herein are only exemplary but not limiting, and these benefits, advantages, effects, etc. should be construed as mandatory in each embodiment of the present invention. In addition, the details given above are only for illustrative purposes and facilitating understanding, but not limiting, and the above details do not limit implementation of the present invention to implementation by the above details.

The block diagrams for the components, apparatuses, devices, and systems involved in the present invention are only examples for illustrative purposes and it is not intended to require or imply that they should be connected, arranged, and configured in the manner shown in the block diagrams. As those of ordinary skill in the art will realize, these components, apparatuses, devices, and systems may be connected, arranged, and configured in any manner. Terms such as "comprising", "containing", and "provided with" are open words, meaning and interchangeable with "including, but not limited to". Terms "or" and "and" used herein refer to and are interchangeable with the term "and/or", unless otherwise specified herein. The term "such as" used herein refers to and is interchangeable with the term "such as, but is not limited to".

The flowcharts disclosed herein and the above method descriptions are only illustrative examples, and it is not intended to require or imply that steps of each embodiment must be performed in the sequences provided. As those of ordinary skill in the art will realize, the steps in the above embodiments may be performed in any sequence. Terms "after that", "then", "next", etc. are not intended to limit the sequence of steps; these terms are only used to guide the reader in reading over descriptions of these methods. In addition, any reference made to a singular element by using the article "a", "one", or "the" should not be construed as limiting the element to the singular.

In addition, the steps and apparatuses in each embodiment described herein are not limited to implementation in a particular embodiment. In fact, based on the concept of the present invention, part of relevant steps and part of relevant apparatuses in each embodiment described herein may be combined to conceive of new embodiments, and these new embodiments also fall into the scope of the present invention.

Each operation of the above-described method may be performed by any appropriate device(s) for carrying out the corresponding functions. The device(s) may comprise various types of hardware and/or software components and/or modules, including, but not limited to, hardware circuits, application-specific integrated circuits (ASICs), or at least one processor.

At least one general-purpose processor, at least one digital signal processor (DSP), ASIC, field programmable gate array (FPGA) or any other programmable logical device (PLD), discrete gate or transistor logic, discrete hardware component or a combination thereof, which are designed for implementing functions described herein, may be used to achieve or carry out each of the exemplified logical blocks, modules, and circuits. At least one general-purpose processor may be at least one microprocessor; however, as an alternative, the at least one processor may be at least one commercially available processor, controller, microcontroller, or state machine. At least one processor may also be implemented as a combination of computing devices, for example, a combination of a DSP and at least one processor, at least one microprocessor, at least one memory, and at least one processor cooperating with a DSP, or any other similar configuration.

A step combining a method or algorithm described herein may be directly embedded in hardware, a software module executed by at least one processor, or a combination thereof. A software module may exist in a tangible storage medium that takes any form. Examples of storage media that can be used include random access memory (RAM), read-only memory (ROM), Flash memory, EPROM, EEPROM, register, hard disk, movable disk, and CD-ROM. A storage medium may be coupled to at least one processor so that the at least one processor may read information from the storage medium and write information to the storage medium. In an alternative mode, a storage medium may be integrated with at least one processor. A software module may be a single instruction or a plurality of instructions, and may be distributed on several different code segments, between different programs, and across a plurality of storage media.

A method disclosed herein comprises at least one memory action for implementing the method. A method and/or action may be interchangeable without departing from the scope defined by the claims. In other words, unless a specific sequence of actions is specified, a specific action sequence and/or use may be modified without departing from the scope defined by the claims.

The function may be implemented by hardware, software, firmware, or a combination thereof. If implemented by software, a function may, as at least one memory instruction, be stored on a tangible computer-readable medium. A storage medium may be any usable tangible medium that can be accessed by a computer. For example, but not as a limitation, such computer-readable media may include RAM, ROM, EEPROM, CD-ROM, or any other optical disk memory, magnetic disk memory, or any other magnetic storage device, or any other tangible medium that is used to carry or store an instruction or desired program code in a data structure format and may be accessed by a computer. Disks and discs used herein include compact disc (CD), laser disc, optical disc, digital versatile disc (DVD), and floppy disk and blu-ray disc, wherein a disk generally reproduces data magnetically, and a disc reproduces data optically by using laser.

Therefore, a computer program product may perform operations described herein. For example, such a computer program product may be a computer-readable tangible medium that has an instruction tangibly stored and/or coded thereon, and the instruction may be executed by at least one processor of at least one memory to perform operations described herein. A computer program product may comprise a packaging material.

Software or an instruction may also be transferred by a transmission medium. For example, a transmission medium, for example, a coaxial cable, a photo-fiber and light cable, a twisted pair line, a digital subscriber line (DSL), or a transmission medium that adopts a wireless technology, for example, infrared light, radio, or microwave, may be used to transfer software from a website, the control device 103, or any other remote source transmission software.

In addition, a module and/or any other appropriate device(s) for implementing a method or technology described here may, when appropriate, be obtained by a user terminal and/or downloaded from a base station and/or by another method. For example, such a device may be coupled to the control device 103 to promote transfer of the device(s) of implementing a method described herein. Alternatively, various methods described herein may be provided by a memory part, for example, a RAM or a ROM, and by a CD, a floppy disk or any other physical storage medium, so that a user terminal and/or base station can obtain various methods when being coupled to the device or providing the device with a storage part. In addition, any other appropriate technology for providing a method and technology described herein to a device may be used.

Other examples and implementation modes fall within the scope and spirit defined by the specification and the attached claims. For example, due to the nature of software, the above-described function may be implemented by at least one processor, hardware, firmware, a hard connection, or software implemented by a combination thereof. Characteristics for implementing a function may also be physically located in each position, including being distributed such that part of the functions are implemented in different physical positions. Moreover, as used herein, including being used in a claim, the "or" used in the listing of items starting with "at least one of" indicates separate listing, so that, for example, the listing of "at least one of A, B, or C" means A or B or C, or AB or AC or BC, or ABC, namely, A and B and C. In addition, the word "exemplary" does not mean that the described example is preferred or better than another example.

Various changes, substitutions, and alterations may be made to the technology described herein without departing from the technology taught as defined by the attached claims. In addition, the scope of the claims herein is not limited to any specific aspect of the above-described processing, machines, manufacture, combination of events, device(s), methods, or actions. Processing, machines, manufacture, combination of events, device(s), methods, or actions currently existing or to be developed later that implement basically the same functions or achieve basically the same results as the corresponding aspects described herein may be utilized. Therefore, the attached claims include in their scope such processing, machines, manufacture, combination of events, device(s), methods, or actions.

The above descriptions are provided for the disclosed aspects so that those of ordinary skill in the art may make or use the present invention. It is readily apparent to those of ordinary skill in the art that various modifications may be made to these aspects and that a general principle defined herein may be applied to another aspect without departing from the scope of the present invention. Therefore, the present invention, instead of being limited to the described aspects, is intended to have the widest scope that is consistent with the principle and novel characteristics disclosed herein.

The above descriptions have been provided for illustrative and descriptive purposes. In addition, such descriptions are not intended to limit embodiments of the present invention to the forms disclosed herein. While a plurality of exemplary aspects and embodiments have been discussed above, those of ordinary skill in the art will understand certain variations, modifications, alterations, additions, and a sub-combination thereof.

The invention claimed is:

1. A data processing method, comprising:
acquiring a first data packet in a local client network;
determining sensitive data in the first data packet;
masking the sensitive data in the first data packet;
generating a second data packet from the first data packet;
sending the second data packet;
wherein the determining sensitive data in the first data packet includes
determining, from a configured sensitive data mapping table, a first mapping table entry matching sensitive data mapping information of the first data packet, and
determining the sensitive data in the first data packet based on sensitive data positioning information recorded in the first mapping table entry;
wherein the first mapping table entry includes the sensitive data mapping information of the first data packet, the sensitive data positioning information and a correspondence between the sensitive data mapping information and the sensitive data positioning information;
wherein the sensitive data mapping information includes keyword information for determining the sensitive data in the first data packet; and
wherein the sensitive data positioning information is indicative of a position of the sensitive data in the first data packet including the sensitive data mapping information.

2. The method of claim 1, further comprising:
receiving an item of sensitive data mapping information and an item of sensitive data positioning information corresponding to the item of sensitive data mapping information, wherein the item of sensitive data mapping information has not been configured;
adding a second mapping table entry in the configured sensitive data mapping table; and
recording, in the second mapping table entry, the item of sensitive data mapping information, the item of sensitive data positioning information and a correspondence between the item of sensitive data mapping information and the item of sensitive data positioning information.

3. The method of claim 1, wherein
the masking the sensitive data in the first data packet includes
replacing the sensitive data in the first data packet; and
recording a first replacement data item, the first replacement data item including (i) the sensitive data replaced in the first data packet, (ii) replacement data used to replace the sensitive data in the first data packet, and (iii) a correspondence between the sensitive data replaced in the first data packet and the replacement data.

4. The method of claim 3, further comprising:
receiving the second data packet;
acquiring replacement data in the second data packet, the replacement data in the second data packet being usable to replace the sensitive data in the first data packet;
determining the first replacement data item based on the replacement data in the second data packet; and
restoring the sensitive data replaced in the first data packet according to the first replacement data item.

5. The method of claim 1, wherein
the masking the sensitive data in the first data packet includes:
subjecting the sensitive data in the first data packet to a masking operation, and
recording a first masking operation item after subjecting of the sensitive data in the first data packet to the masking operation; and
the first masking operation item includes
sensitive data that has undergone the masking operation in the second data packet, and
a correspondence between the sensitive data in the first data packet and the sensitive data that has undergone the masking operation in the second data packet.

6. The method of claim 5, further comprising:
receiving the second data packet;
acquiring the sensitive data that has undergone the masking operation in the second data packet;
determining the first masking operation item based on the sensitive data that has undergone the masking operation in the second data packet; and
restoring the sensitive data in the first data packet according to the first masking operation item.

7. The method of claim 1, further comprising:
generating a masking tag, the masking tag being one of (i) used to identify whether the second data packet includes masked sensitive data, or (ii) used to identify a data type of masked sensitive data in the second data packet; and
sending the masking tag.

8. The method of claim 7, wherein the sending the masking tag comprises one of:
sending the masking tag and, sending indication information indicating a correspondence between the masking tag and the second data packet; or
sending the second data packet including the masking tag placed at a first position in the masked sensitive data in the second data packet.

9. A sensitive data processing device, comprising:
at least one processor; and
at least one memory coupled with the at least one processor;
wherein the at least one memory stores at least one computer-executable instruction that, when executed by the at least one processor, causes the sensitive data processing device to perform at least:
acquiring a first data packet in a local client network,
determining sensitive data in the first data packet,
masking the sensitive data in the first data packet,
generating a second data packet from the first data packet, and
sending the second data packet;
wherein the determining sensitive data in the first data packet includes
determining, from a configured sensitive data mapping table, a first mapping table entry matching sensitive data mapping information of the first data packet, and
determining the sensitive data in the first data packet based on sensitive data positioning information recorded in the first mapping table entry;
wherein the first mapping table entry includes the sensitive data mapping information of the first data packet, the sensitive data positioning information and a correspondence between the sensitive data mapping information and the sensitive data positioning information;
wherein the sensitive data mapping information includes keyword information for determining the sensitive data in the first data packet; and
wherein the sensitive data positioning information is indicative of a position of the sensitive data in the first data packet including the sensitive data mapping information.

10. A non-transitory computer-readable medium storing at least one computer instruction, the at least one computer instruction, when executed by at least one processor at a sensitive data processing device, causing the sensitive data processing device to perform at least:
acquiring a first data packet in a local client network;
determining sensitive data in the first data packet;
masking the sensitive data in the first data packet;
generating a second data packet from the first data packet;
sending the second data packet generated;
wherein the determining sensitive data in the first data packet includes
determining, from a configured sensitive data mapping table, a first mapping table entry matching sensitive data mapping information of the first data packet, and
determining the sensitive data in the first data packet based on sensitive data positioning information recorded in the first mapping table entry;
wherein the first mapping table entry includes the sensitive data mapping information of the first data packet, the sensitive data positioning information and a correspondence between the sensitive data mapping information and the sensitive data positioning information;
wherein the sensitive data mapping information includes keyword information for determining the sensitive data in the first data packet; and
wherein the sensitive data positioning information is indicative of a position of the sensitive data in the first data packet including the sensitive data mapping information.

11. The sensitive data processing device of claim 9, wherein
the at least one computer-executable instruction, when executed by the at least one processor, causes the sensitive data processing device to perform the masking the sensitive data in the first data packet by at least replacing the sensitive data in the first data packet;
the at least one computer-executable instruction, when executed by the at least one processor, causes the sensitive data processing device to perform recording of a first replacement data item; and
the first replacement data item includes (i) the sensitive data replaced in the first data packet, (ii) replacement data used to replace the sensitive data in the first data packet, and (iii) a correspondence between the replaced sensitive data in the first data packet and the replacement data.

12. The sensitive data processing device of claim 9, wherein
the at least one computer-executable instruction, when executed by the at least one processor, causes the sensitive data processing device to perform the masking the sensitive data in the first data packet by at least subjecting the sensitive data in the first data packet to a masking operation;

the at least one computer-executable instruction, when executed by the at least one processor, causes the sensitive data processing device to perform recording of a first masking operation entry; and the first masking operation entry includes the sensitive data in the first data packet to the masking operation,
sensitive data that has undergone the masking operation in the second data packet, and
a correspondence between the sensitive data in the first data packet and the sensitive data that has undergone the masking operation in the second data packet.

13. The sensitive data processing device of claim 9, wherein the at least one computer-executable instruction, when executed by the at least one processor, causes the sensitive data processing device to perform
generating a masking tag, the masking tag being one of (i) used to identify whether the second data packet includes masked sensitive data, or (ii) used to identify a data type of masked sensitive data in the second data packet; and
sending the masking tag.

14. The non-transitory computer-readable medium of claim 10, wherein
the at least one computer instruction, when executed by the at least one processor, causes the sensitive data processing device to perform the masking the sensitive data in the first data packet by at least replacing the sensitive data in the first data packet;
the at least one computer instruction, when executed by the at least one processor, causes the sensitive data processing device to perform recording of a first replacement data item; and
the first replacement data item includes (i) the sensitive data replaced in the first data packet, (ii) replacement data used to replace the sensitive data in the first data packet, and (iii) a correspondence between the replaced sensitive data in the first data packet and the replacement data.

15. The non-transitory computer-readable medium of claim 10, wherein
the at least one computer instruction, when executed by the at least one processor, causes the sensitive data processing device to perform the masking the sensitive data in the first data packet by at least subjecting the sensitive data in the first data packet to a masking operation;
the at least one computer instruction, when executed by the at least one processor, causes the sensitive data processing device to perform recording of a first masking operation entry; and
the first masking operation entry includes:
sensitive data that has undergone the masking operation in the second data packet, and
a correspondence between the sensitive data in the first data packet and the sensitive data that has undergone the masking operation in the second data packet.

16. The non-transitory computer-readable medium of claim 10, wherein the at least one computer instruction, when executed by the at least one processor, causes the sensitive data processing device to perform
generating a masking tag, the masking tag being one of (i) used to identify whether the second data packet includes masked sensitive data, or (ii) used to identify a data type of masked sensitive data in the second data packet; and
sending the masking tag.

* * * * *